United States Patent
Watfa et al.

(10) Patent No.: US 10,616,905 B2
(45) Date of Patent: Apr. 7, 2020

(54) EPC ENHANCEMENTS FOR PROXIMITY SERVICES

(71) Applicant: INTERDIGITAL PATENT HOLDINGS, INC., Wilmington, DE (US)

(72) Inventors: Mahmoud Watfa, Saint Leonard (CA); Guanzhou Wang, Brossard (CA); Saad Ahmad, Montreal (CA); Li-Hsiang Sun, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/952,038

(22) Filed: Apr. 12, 2018

(65) Prior Publication Data

US 2018/0234990 A1     Aug. 16, 2018

Related U.S. Application Data

(63) Continuation of application No. 14/902,079, filed as application No. PCT/US2014/045453 on Jul. 3, 2014, now Pat. No. 9,974,090.

(Continued)

(51) Int. Cl.
    *H04W 72/10*        (2009.01)
    *H04W 76/23*        (2018.01)
(Continued)

(52) U.S. Cl.
CPC ............. *H04W 72/10* (2013.01); *H04W 4/80* (2018.02); *H04W 36/0011* (2013.01); *H04W 76/23* (2018.02); *H04W 36/0022* (2013.01)

(58) Field of Classification Search
None
See application file for complete search history.

(56) References Cited

U.S. PATENT DOCUMENTS

2004/0052212 A1   3/2004   Baillargeon
2005/0094640 A1   5/2005   Howe
(Continued)

FOREIGN PATENT DOCUMENTS

CN     101796783     8/2010
GB     2506913 A     4/2014
(Continued)

OTHER PUBLICATIONS

3rd Generation Partnership Project (3GPP), S2-131698, "Two Solutions for ProSe Service Continuity", Intel, III, Sony, SA WG2 Meeting #S2-97, Busan, South Korea, May 27-31, 2013, pp. 1-8.

(Continued)

*Primary Examiner* — Brian S Roberts
(74) *Attorney, Agent, or Firm* — Yin Shao

(57) ABSTRACT

Systems, methods, and instrumentalities are disclosed to describe reporting and/or reacting to a mobility event. A wireless transmit/receive unit (WTRU) may comprise a processor configured, at least in part, to establish a proximity service (ProSe) session with a second WTRU, detect the occurrence of a mobility event in a cellular network while the ProSe session is ongoing, determine a type of action to be performed with respect to the ProSe session based on one or more of the type of mobility event and type of ProSe session, and transmit a notification to a node in the cellular network, wherein the notification includes an indication of an action to be performed on the ProSe session. The node may be one of an evolved Node B (eNB), proximity server, or mobility management entity (MME). The node may be the second WTRU.

18 Claims, 13 Drawing Sheets

Related U.S. Application Data

(60) Provisional application No. 61/880,822, filed on Sep. 20, 2013, provisional application No. 61/842,877, filed on Jul. 3, 2013.

(51) Int. Cl.
*H04W 4/80* (2018.01)
*H04W 36/00* (2009.01)

(56) References Cited

U.S. PATENT DOCUMENTS

| | | | |
|---|---|---|---|
| 2007/0248064 | A1 | 10/2007 | Shaheen |
| 2009/0067372 | A1 | 3/2009 | Shah et al. |
| 2009/0092083 | A1 | 4/2009 | Shagdar et al. |
| 2009/0271623 | A1* | 10/2009 | Forsberg ............... H04W 12/04 713/168 |
| 2011/0136473 | A1 | 6/2011 | Gupta et al. |
| 2011/0228666 | A1 | 9/2011 | Barbieri et al. |
| 2011/0244899 | A1 | 10/2011 | Li et al. |
| 2011/0294474 | A1 | 12/2011 | Barany et al. |
| 2012/0155428 | A1* | 6/2012 | Bovo ................. H04L 43/18 370/331 |
| 2012/0207100 | A1 | 8/2012 | Hakola et al. |
| 2012/0233635 | A1* | 9/2012 | Hakola ................ H04W 12/02 725/25 |
| 2013/0095753 | A1 | 4/2013 | Chen |
| 2013/0290696 | A1 | 10/2013 | Broustis et al. |
| 2014/0004796 | A1 | 1/2014 | Cakulev et al. |
| 2014/0112258 | A1 | 4/2014 | Vanderveen |
| 2014/0126460 | A1 | 5/2014 | Bienas et al. |
| 2014/0146677 | A1 | 5/2014 | Howes et al. |
| 2014/0187165 | A1 | 7/2014 | Wu et al. |
| 2014/0206372 | A1 | 7/2014 | Zeng et al. |
| 2014/0235234 | A1 | 8/2014 | Jang et al. |
| 2016/0277445 | A1* | 9/2016 | Wager ................... H04W 12/00 |

FOREIGN PATENT DOCUMENTS

| | | |
|---|---|---|
| WO | WO-2007/102208 | 9/2007 |
| WO | WO 2011/130630 A1 | 10/2011 |
| WO | WO 2013/012241 A2 | 1/2013 |
| WO | WO-2013/044718 | 4/2013 |
| WO | WO-2015/003153 | 1/2015 |

OTHER PUBLICATIONS

3rd Generation Partnership Project (3GPP), S2-131937, "Solution for Triggering Service Continuity in ProSe", LG Electronics, SA WG2 Meeting #S2-97, Busan, South Korea, May 27-31, 2013, 6 pages.

3rd Generation Partnership Project (3GPP), SP-110638, "WID on Proposal for a Study on Proximity-Based Services", TSG SA WG1, 3GPP TSG SA Plenary Meeting #53, Fukuoka, Japan, Sep. 19-21, 2011, 5 pages.

3rd Generation Partnership Project (3GPP), TR 22.803 V0.3.0, "Technical Specification Group SA, Feasibility Study for Proximity Services (ProSe) (Release 12)", May 2012, 24 pages.

3rd Generation Partnership Project (3GPP), TR 22.803 V0.5.0, "Technical Specification Group SA, Feasibility Study for Proximity Services (ProSe) (Release 12)", Aug. 2012, pp. 1-34.

3rd Generation Partnership Project (3GPP), TR 22.803 V12.1.0, "Technical Specification Group Services and System Aspects, Feasibility Study for Proximity Services (ProSe) (Release 12)", Mar. 2013, pp. 1-45.

3rd Generation Partnership Project (3GPP), TR 22.803 V12.2.0, "Technical Specification Group Services and System Aspects, Feasibility Study for Proximity Services (ProSe) (Release 12)", Jun. 2013, pp. 1-45.

3rd Generation Partnership Project (3GPP), TR 23.703 V0.4.1, "Technical Specification Group Services and System Aspects, Study on Architecture Enhancements to Support Proximity Services (ProSe) (Release 12)", Jun. 2013, pp. 1-85.

3rd Generation Partnership Project (3GPP), TS 22.278 V12.3.0, "Technical Specification Group Services and System Aspects, Service Requirements for the Evolved Packet System (EPS) (Release 12)", Jun. 2013, pp. 1-45.

3rd Generation Partnership Project (3GPP), TS 23.401 V12.0.0, "Technical Specification Group Services and System Aspects, General Packet Radio Service (GPRS) Enhancements for Evolved Universal Terrestrial Radio Access Network (E-UTRAN) Access (Release 12)", Mar. 2013, 290 pages.

3rd Generation Partnership Project (3GPP), TS 23.401 V12.1.0, "Technical Specification Group Services and System Aspects, General Packet Radio Service (GPRS) Enhancements for Evolved Universal Terrestrial Radio Access Network (E-UTRAN) Access (Release 12)", Jun. 2013, 291 pages.

3rd Generation Partnership Project (3GPP), TS 36.331 V10.5.0, "Technical Specification Group Radio Access Network, Evolved Universal Terrestrial Radio Access (E-UTRA), Radio Resource Control (RRC), Protocol Specification (Release 10)", Mar. 2012, pp. 1-302.

3rd Generation Partnership Project (3GPP), TS 36.413 V10.4.0, "Technical Specification Group Radio Access Network, Evolved Universal Terrestrial Radio Access Network (E-UTRAN), S1 Application Protocol (S1AP) (Release 10)", Dec. 2011, pp. 1-255.

Krumm et al., "The Nearme Wireless Proximity Server", The Sixth International Conference on Ubiquitous Computing, Nottingham, England, Sep. 7-10, 2004, 18 pages.

Sarkar et al., "A MAC Protocol to Support QoS for Multimedia Traffic Transmission over Ad Hoc Networks", IWCMC'07, Honolulu, Hawaii, USA, Aug. 12-16, 2007, pp. 535-540.

3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.8.0, Mar. 2013, 54 pages.

Nokia et al, "LTE Device to Device Proximity Services—Scenarios", 3GPP Tdoc R1-131250, 3GPP TSG RAN WG1 Meeting #72bis, Chicago, US, Apr. 15-19, 2013, 6 pages.

Samsung, "Plan on functional components for D2D", 3GPP Tdoc R2-132343, 3GPP TSG-RAN WG2 Meeting #83, Barcelona, Spain, Aug. 19-23, 2013, 3 pages.

* cited by examiner

EPC ENHANCEMENTS FOR PROXIMITY SERVICES

CROSS-REFERENCE TO RELATED APPLICATIONS

This application is a continuation of U.S. Non-provisional Patent Application No. 14/902,079, filed Dec. 30, 2015, which is the National Stage entry under 35 U.S.C. § 371 of Patent Cooperation Treaty (PCT) Application No. PCT/US2014/045453, filed Jul. 3, 2014, which claims the benefit of U.S. Provisional Patent Application No. 61/842,877, filed Jul. 3, 2013 and of U.S. Provisional Patent Application No. 61/880,822, filed Sep. 20, 2013, the contents of which are each hereby incorporated by reference herein in their entirety.

BACKGROUND

In wireless communication networks, e.g., mobile networks, wireless transmit/receive units (WTRUs) may communicate with network nodes using various communication protocols. One or more of the WTRUs may communicate directly with nearby WTRUs, for example with another WTRU in close proximity and/or with a proximity server. The proximity wireless devices may move from one radio access technology (RAT) to another.

SUMMARY

Systems, methods, and instrumentalities are disclosed for reporting and/or reacting to a mobility event. For example, a wireless transmit/receive unit (WTRU) may be configured to establish a proximity service (ProSe) session with a second WTRU, detect the occurrence of a mobility event in a cellular network while the ProSe session is ongoing, determine a type of action to be performed with respect to the ProSe session based on one or more of the type of mobility event or the type of ProSe session, and transmit a notification to a node in the cellular network based on the determined action to be performed. For example, the notification may include an indication of the action to be performed with respect to the ProSe session. The node may be an evolved Node B (eNB), a proximity server, a mobility management entity (MME), and/or other nodes in a cellular core network. In an example, the node receiving the notification may be the second WTRU involved in the ProSe Session.

The WTRU may be configured to transmit the notification in one or more of an RRC message, an NAS message, or application layer message. For example, the WTRU may be configured to transmit the notification to an application server via the application layer control plane. The WTRU may be configured to transmit the notification to an MME, and the notification may include mobility event information. The WTRU may be configured to receive a mobility command. The WTRU may be configured to transmit a notification when the WTRU receives the mobility command. The WTRU may be configured to transmit a notification including an indication of how the ProSe session should be continued in view of the mobility event. For example, the WTRU may indicate that the ProSe session is to be continued via a wireless local area network (WLAN) (e.g., Wi-Fi). For example, the ProSe session may be continued via WLAN when the mobility event includes an inter-system change.

The WTRU may be configured to transmit a notification including an indication to continue the ProSe session via the Internet. For example, the ProSe session may be continued via the Internet when the mobility event corresponds to a circuit-switched fallback (CSFB). The WTRU may be configured to transmit a notification including an indication to suspend the ProSe session. For example, the ProSe session may be suspended in some situations where the mobility event corresponds to a CSFB. In an example, the WTRU may be configured to transmit a notification including an indication to suspend the ProSe session when the mobility event corresponds to an inter-RAT system change due to CSFB. The WTRU may be configured to transmit a notification including an indication to suspend the ProSe session, for example, when the mobility event corresponds to an inter-PLMN handover (HO). The WTRU may be configured to transmit a notification including an indication to suspend the ProSe session, when the mobility event corresponds to an intra-RAT HO. The WTRU may be configured to transmit a notification including an indication to suspend the ProSe session, for example when the mobility event corresponds to an intra-RAT HO. The WTRU may be configured to send session management requests for ProSe sessions, for example via a ratio access network (RAN) node such as an evolved Node B.

Examples of mobility events include a request to perform Circuit Switched Fallback (CSFB) for voice calls, an inter-system change in an inter radio access technology (RAT) handover, or an inter-public land mobile network (PLMN) handover.

Examples of actions that may be performed with respect to the ProSe session based on the occurrence of the mobility event include suspending the ProSe session, continuing the ProSe session using a WLAN, continuing the session via the Internet, and/or the like. The WTRU may be configured to transmit more than one notification, for example notifications may be sent from multiple applications. As an example, notifications from several different applications may be sent sequentially to indicate application specific actions to be taken in view of the pending or ongoing mobility event.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
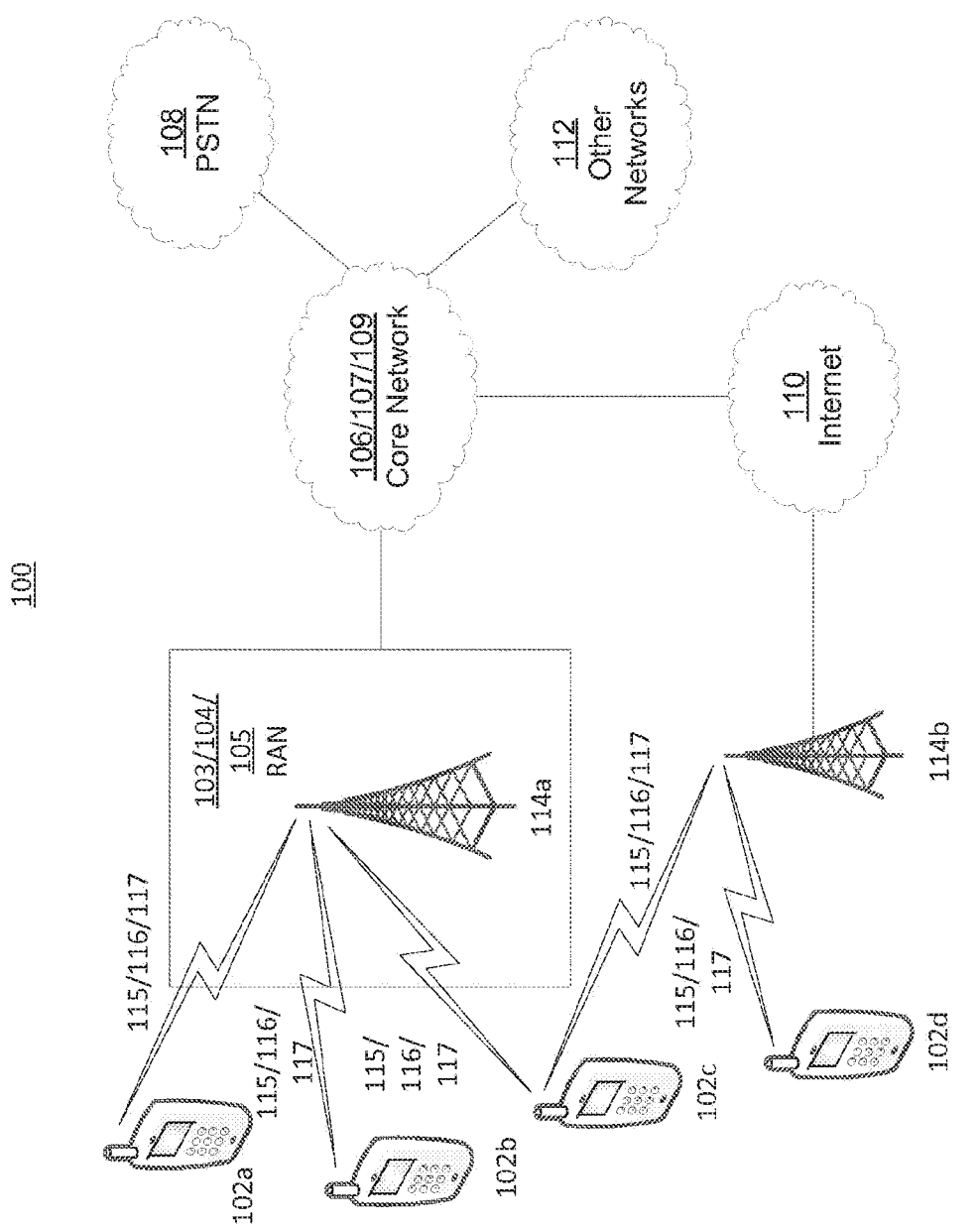
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, for example voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, for example code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communication in a wireless environment. By way of example, the WTRUs 102a, 102b, 102c, 102d may be configured to transmit and/or receive wireless signals and may include a user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, for example the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), for example a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each section of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, for example CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, for example a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, for example user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that user common communication protocols, for example the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
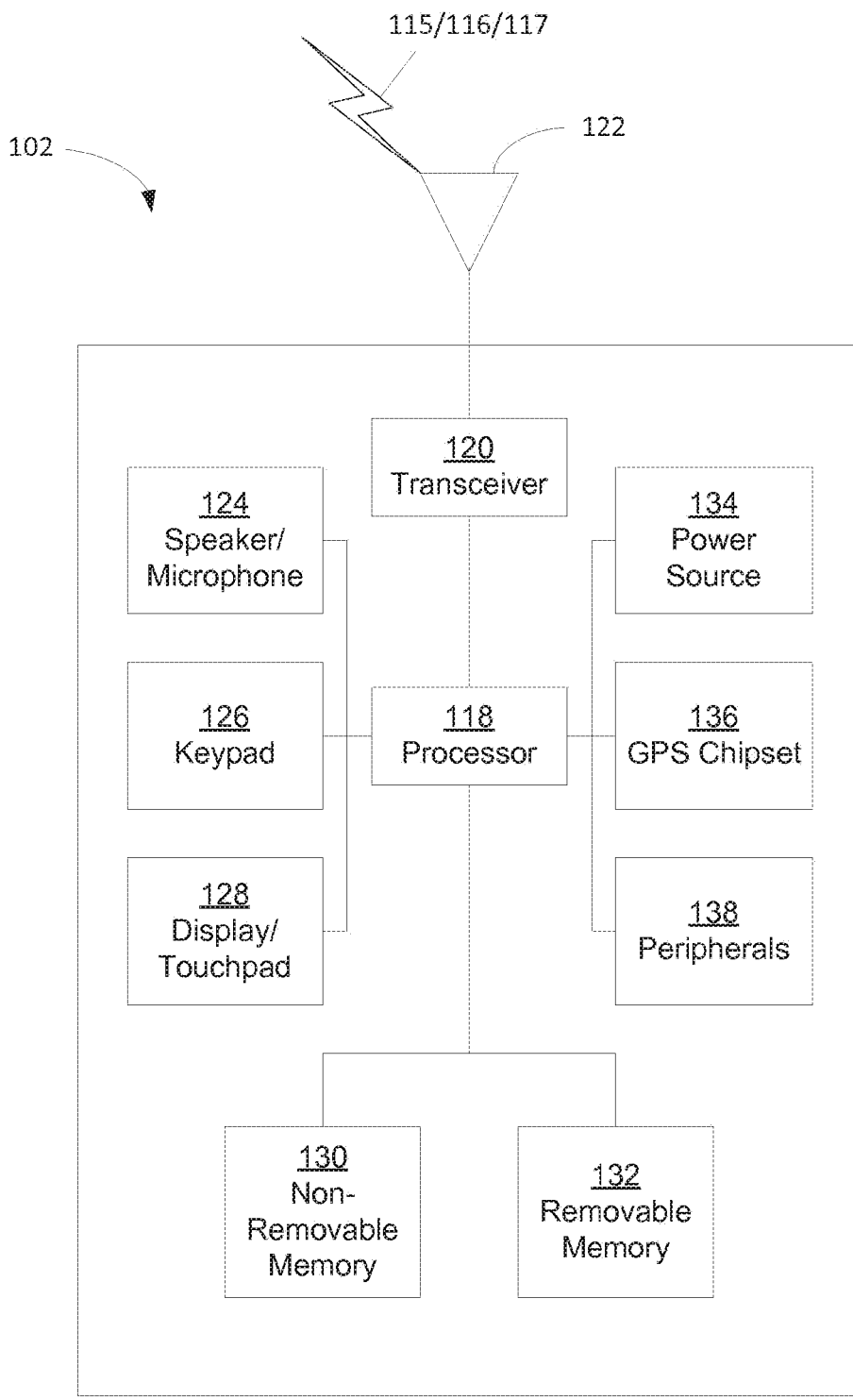
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, for example but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, for example the non-removable memory 130 and/or the removable memory 132. The non-removable memory 130 may include random-access memory (RAM), read-only memory (ROM),a hard disk, or any other type of memory store device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, for example on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
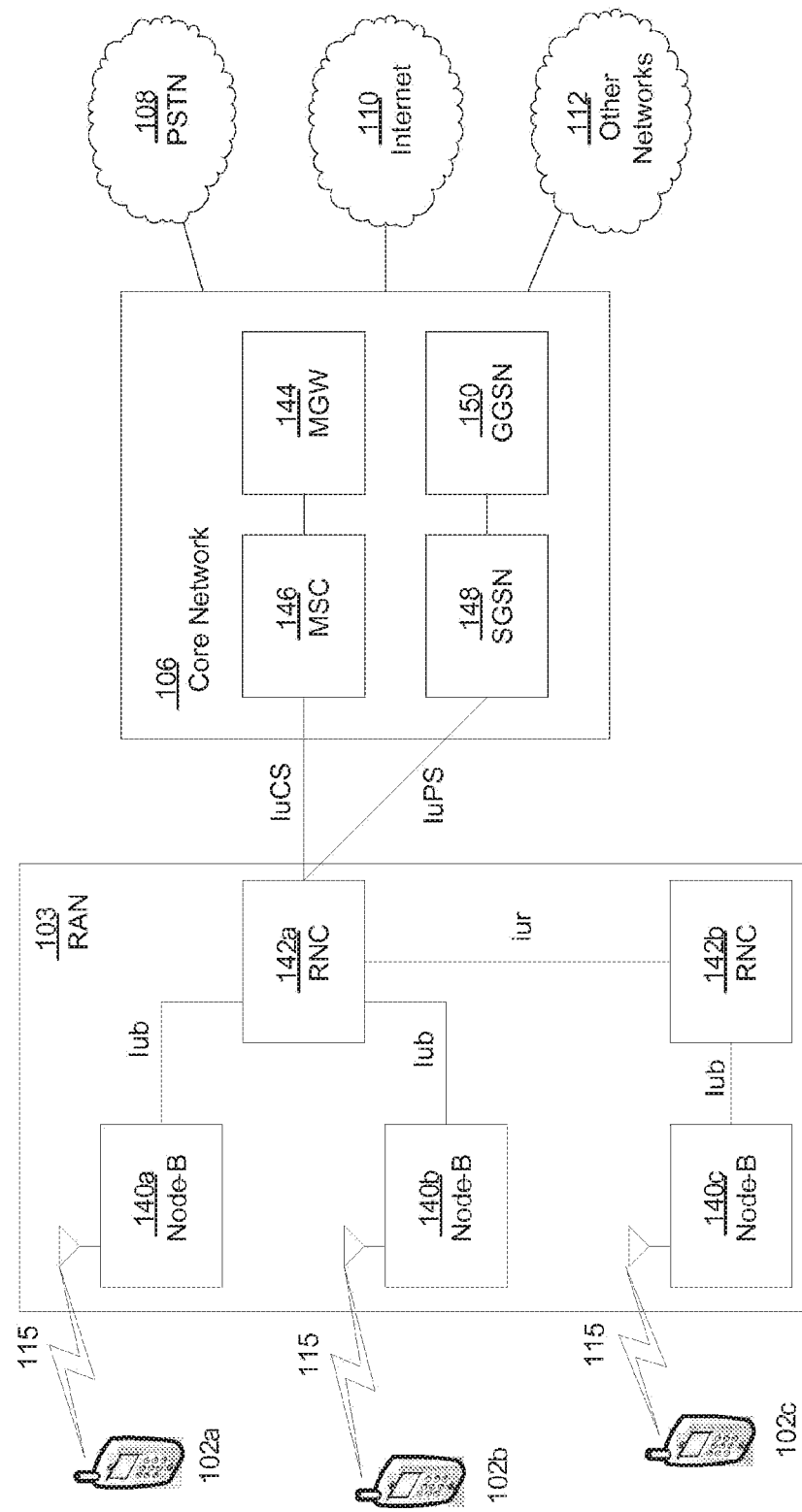
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 14a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, for example outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, for example the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and GGSN 150 may provide the WTRUs 102a, 102b, 102c with access to packet-switched networks, for example the Internet 110, to facilitate communications between and the WTRUs 102a, 102b, 102c and the IP-enabled devices.

As noted above, the core network 106 may also be connected to the networks 112, which may include other wired or wireless networks that are owned and/or operated by other service providers.

Figure 1D:
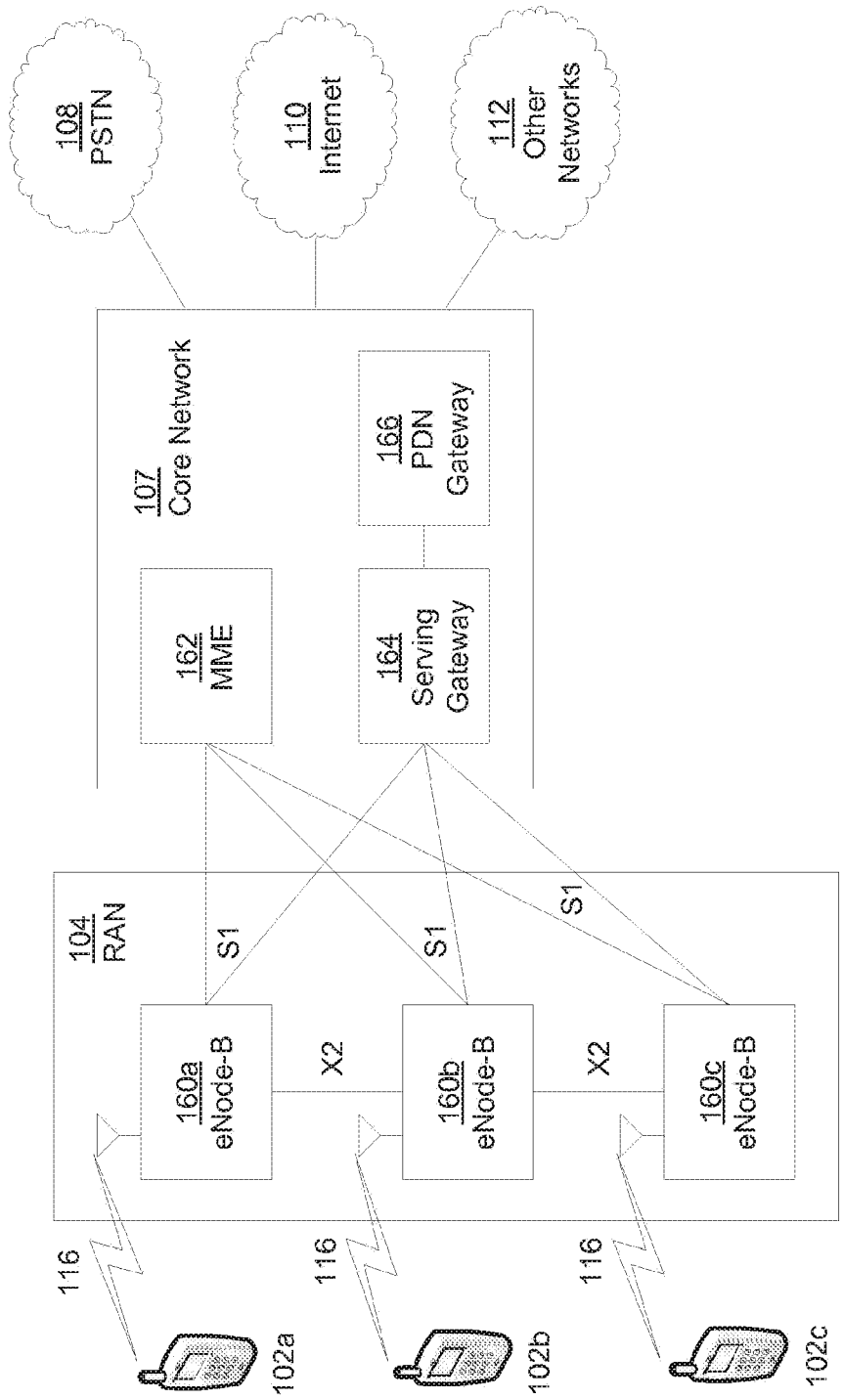
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, for example GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, for example anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, for example the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, for example the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
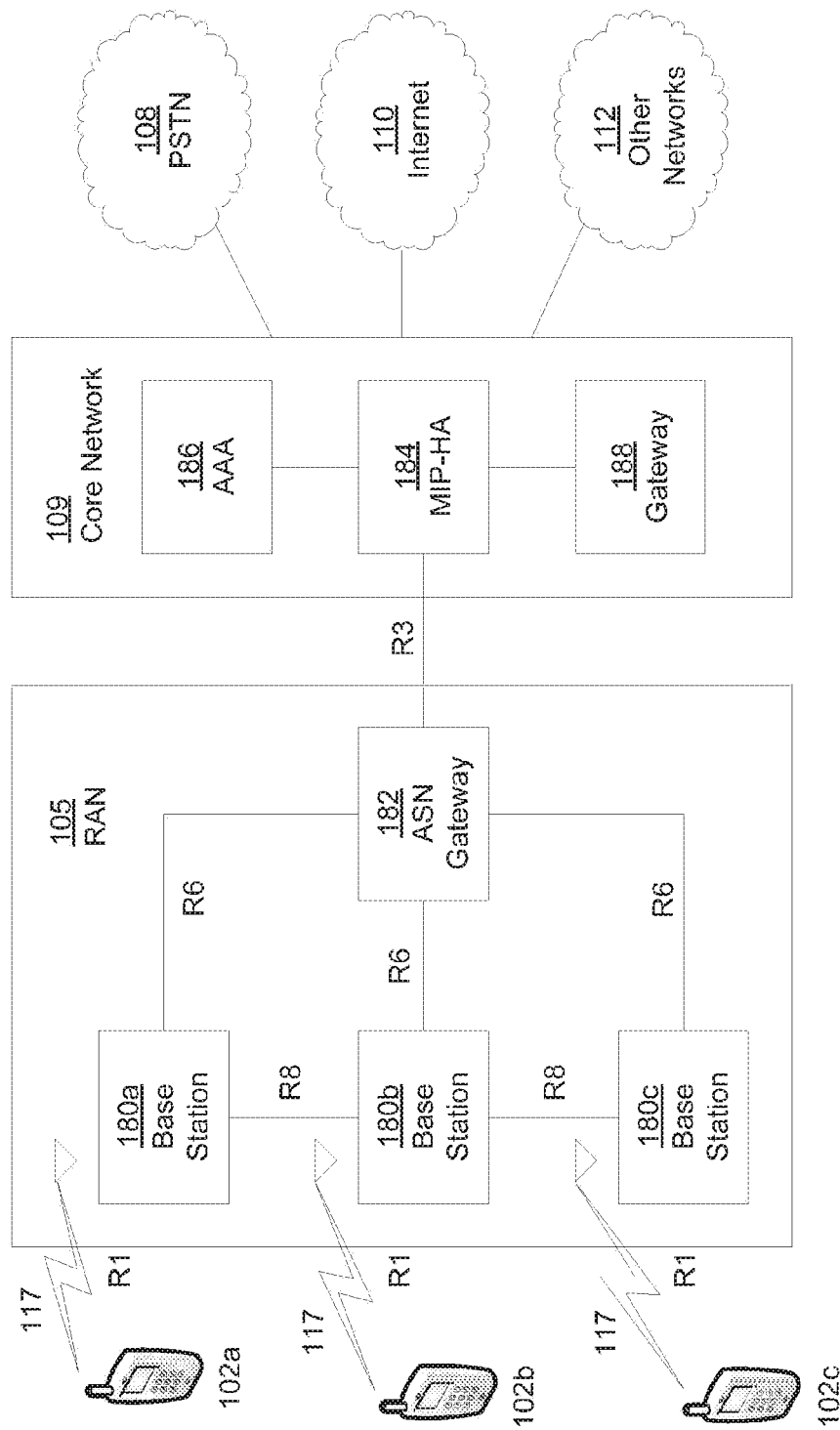
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, for example handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, for example the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide WTRUs 102a, 102b, 102c with access to circuit-switched networks, for example the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
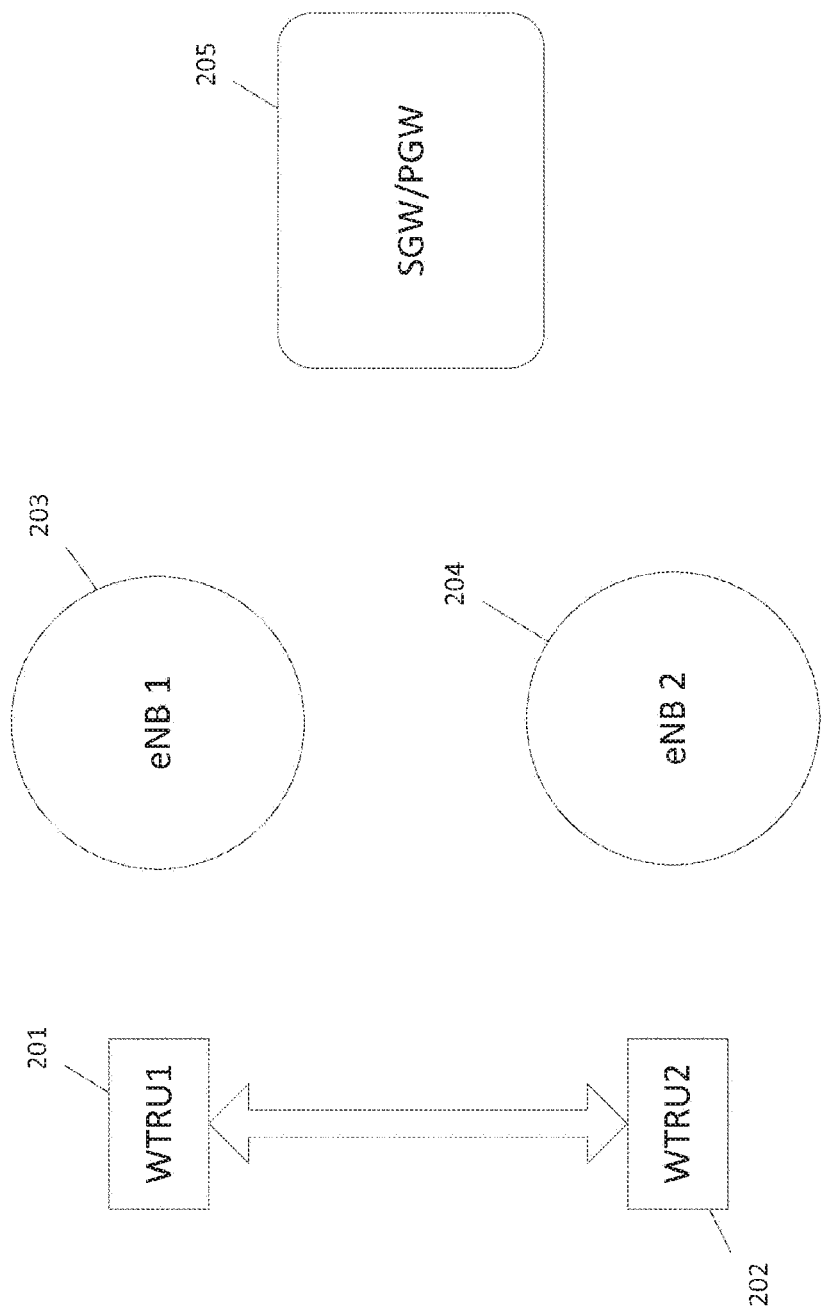
FIG. 2 is a diagram illustrating an example of a direct user equipment (WTRU) to WTRU communication.
Figure 3:
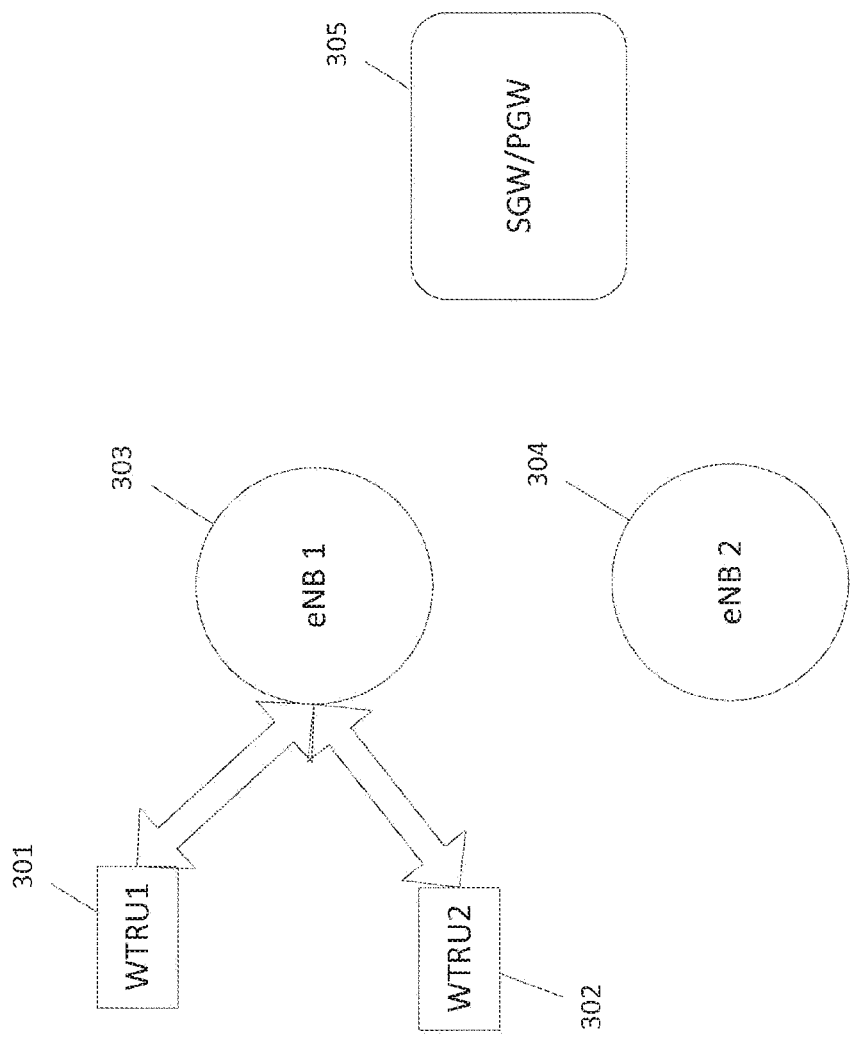
FIG. 3 is a diagram illustrating an example of one or more WTRUs communicating via a radio access network (RAN) (e.g., an eNodeB).

FIG. 2 depicts a diagram illustrating an example of direct wireless transmit/receive unit (WTRU) to WTRU communication. FIG. 3 depicts a diagram illustrating an example of one or more WTRUs communicating via a radio access network (RAN) (e.g., evolved Node B (eNB)). Both FIG. 2 and FIG. 3 illustrate examples of different type of ProSe communication techniques that may be used by WTRUs participating in the ProSe session (e.g., communicating directly and/or communicating through a RAN node such as a base station, Node-B, eNB, etc.).

As illustrated in FIG. 2, if devices, for example WTRU1 201 and WTRU2 202, are in proximity with respect to each other, they may be able to use a direct mode data path for communication. In the direct mode data path illustrated in FIG. 2, WTRU1 201 and WTRU2 202 may communicate directly with each other and may be considered to be "connected" (e.g., after appropriate procedure(s), for example authentication). WTRU1 201 and WTRU2 202 may communicate without eNB 203, 204 and SGW/PGW 205 being included in the data path for the communications. When used herein, the term direct ProSe communication may refer to communications between WTRUs that does not utilize other network nodes for routing the communications (e.g., there is a direct air interface between the WTRUs participating in the ProSe session).

As illustrated in FIG. 3, if devices, for example WTRU1 301 and WTRU2 302, are in proximity of each other, they may be able to use a locally routed data path for communication. In the locally routed data path such as illustrated in FIG. 3, WTRU1 301 and WTRU2 302 are connected to each other through eNB 303 without the data being routed through other nodes in the core network (e.g., without involving serving or packet gateways). In another example, the data path may be routed through a serving gateway without involving a packet gateway. When used herein, the term indirect ProSe communication may refer to communications between WTRUs that utilizes at least one network node for routing the communications, but the indirect ProSe communication may be routed without involving a packet gateway (e.g., PDN gateway) that routes the communications through an external network such as the Internet. Thus, indirect ProSe communications may be routed through one or more 3GPP network nodes (e.g., RAN nodes, S-GWs, etc.) without the communication being sent to an external network outside the 3GPP network (e.g., without being routed by a P-GW/PDN-GW to an external network such as the internet).

The architectures illustrated in FIGS. 2 & 3 may be used to implement optimized proximity based service paths for data exchange.

In an internet protocol (IP) data exchange between one or more users, the WTRUs may communicate via a network, for example the Internet. However, communication via the Internet (e.g., which may involve a data path being routed through a cellular core network) may lead to excessive signaling and/or routing when the one or more WTRUs are in close proximity. In such situations, the data paths between the WTRUs may be enhanced. For example, the data paths between the WTRUs may be enhanced such that the IP connections may be established directly, for example, using an LTE radio interface or WLAN RAT (e.g., could be implemented as shown in FIG. 2). In an example, the data path may be enhanced by routing the data path between the WTRUs via a radio access network (RAN) (e.g., via an evolved Node B (eNB)) without involving other core network nodes, for example illustrated in FIG. 3. Although two WTRUs are shown in FIGS. 2 & 3, a group of WTRUs may participate in a proximity session. Another example of an enhanced data path for proximity services may be a data path that involved a RAN and a serving gateway within a cellular network, but does not include other cellular core network nodes such as a packet gateway (e.g., which may typically interface to larger networks such as the Internet).

A mobility event (e.g., predictable mobility events) may cause a disruption to an existing proximity session. The proximity session may involve one or more nodes, e.g., in case of group communication. The proximity session may involve communication between one or more WTRUs and/or a Proximity Server (pServer). The pServer may be involved with discovery of other WTRUs capable of performing proximity based communication sessions. The pServer may be involved with control of the proximity-based communication session. For a mobility event that may occur (e.g., an inter-system event such as a handover or fallback from one RAT to another RAT), not informing the other nodes or participants in the proximity session may cause a sudden disruption to the proximity-based service. Although the proximity application may attempt to re-establish the session, without taking further action and re-establishment may continuously fail, as it may be difficult to properly re-route the communications in light of the mobility event. The users of the WTRUs involved in the proximity session may perceive bad service experience if no action is taken after the occurrence of the mobility event (e.g., continue the session via another network, for example the Internet, or via another RAT, etc.). The parties involved may be notified about the mobility event and/or a possible response by the nodes that may follow.

The WTRU may be configured to implement procedures to handle or otherwise take into account one or more pending mobility events during a proximity session. A proximity session may be active between one or more WTRUs. The proximity session may involve other nodes in the system (e.g., a proximity server). The proximity server may be included in the evolved packet core (EPC) network and/or otherwise interface to the EPC network. For example, the proximity server may be configured to communicate with the mobility management entity (MME). The proximity server may be connected to other nodes in the EPC (e.g., via a direct interface or via a routed communication path). The proximity server may be connected to one or more EPC nodes such as the MME via the internet. The MMEs may be involved in the proximity sessions, for example, if the WTRUs belong to different public land mobile networks (PLMNs). EPC nodes, such as the MME, may be involved during the setup of a proximity session.

Various mobility events may affect the proximity session. For example, one of the WTRUs involved in the proximity sessions may be aware or otherwise discover a pending mobility event that could affect the ProSe session. As an example, one of the WTRUs in the ProSe session may request to perform Circuit Switched Fallback (CSFB) for voice calls and/or an inter-system change (e.g., due to inter-RAT handover). Based on determining that the mobility event is occurring or is about to occur. The WTRU may be configured to trigger a notification to each of the entities that may be involved in the proximity session. For example, the notification may be sent to the nodes that may be responsible to setup the session (e.g., a proximity server, an MME, another core network node, one or more RAN nodes, etc.) and/or nodes that may be involved in the exchange of IP data for the proximity sessions (e.g., WTRUs, eNBs, etc.).

A WTRU may comprise a processor configured, at least in part, to establish a proximity service (ProSe) session with a second WTRU. A WTRU may be configured to establish a ProSe session with a second WTRU, detect the occurrence of a mobility event in a cellular network while the ProSe session is ongoing, determine a type of action to be performed with respect to the ProSe session based on one or more of the type of mobility event or the type of ProSe session, and transmit a notification to a node in the cellular network based on the determined action to be performed. For example, the notification may include an indication of the action to be performed with respect to the ProSe session. The node may be an evolved Node B (eNB), a proximity server, a mobility management entity (MME), and/or other nodes in a cellular core network. In an example, the node receiving the notification may be the second WTRU involved in the ProSe Session.

When used herein, sending an indication or notification regarding a mobility event may refer to indicating that the mobility event is going to occur or has occurred and/or indicating an action to be preformed in light of the pending mobility event. For example, a WTRU may determine that it is going to preform an intersystem change in order to preform CSFB. The WTRU may send an indication of the mobility event to other WTRUs in the session, which may include indicating the occurrence of the mobility event and/or may include the WTRU sending an action to be preformed by another device in view of the pending mobility event (e.g., to keep the proximity session on-going and/or to limit service disruption by proactively terminating the ProSe session).

A WTRU (e.g., a WTRU involved in a proximity session) may be configured to send an indication including information about a pending mobility event to one or more of the parties that are involved in the proximity session to facilitate coordination of resources. A mobility event may include, for example, an inter-system change due to CS services (e.g., CSFB or supplementary services), an intra-RAT handover (HO), an inter-RAT HO, an inter-PLMN HO (e.g., with intra-RAT or inter-RAT HO), a Wi-Fi offload (e.g., at an IP flow level or a bearer level or moving each of the PDN connections), network assisted cell change order, etc. As an example, for purposed of description, a mobility event may be considered to be occurring when processing to initiate the mobility event begins, including a request for a mobility event, a request for initiation of a mobility event, initiation of the mobility event, a pending mobility event and/or completion of the mobility event, etc. When referred to herein, the occurrence of a mobility may include a request for a mobility event, a request for initiation of a mobility event, initiation of the mobility event, a pending mobility and/or the completion of the mobility event, etc.

The WTRU may be configured to decide that there is a mobility event when certain measurement reports may be sent. For example, the WTRU may decide that there is a mobility event when certain measurement reports may be sent indicating a fall of the signal strength within a given threshold and/or when measurement reports may be sent for specific measurement events as configured by the lower layers (e.g., RRC). A WTRU may determine that a mobility event is occurring or is going to occur based on receiving a mobility message. A mobility message may include RRC messages, a handover command such as an RRCConnectionReconfiguration message including the MobilityInfo IE from the eNB, etc. A WTRU that may be registered for proximity service may send a notification to one or more of the other nodes with which a proximity service may have been established. For example, a WTRU that may be registered for proximity service may send a notification to one or more of the other nodes with which a proximity service may have been established upon a pending request for CSFB (e.g., due to mobile originated (MO) and/or mobile terminated (MT) voice/supplementary service request). Being registered for proximity service may include one or more of being in an active proximity session, having the capability for proximity service, having been informed by the network that proximity service is supported and/or allowed for the WTRU, having registered with a proximity server, etc. The notification indicating the pending or imminent mobility event may be sent, for example, via an NAS message, a radio resource control (RRC) message, or via an application (e.g., as an application layer data notification).

A WTRU may be configured to send an indication to an application server that a mobility event has been triggered or is soon to be triggered, e.g., via the application layer control or user plane. In an example, the application server may trigger notifications to one or more of the other WTRUs that may be involved in the proximity sessions based on the notification of the mobility event from the WTRU. In an example, the application server may trigger notifications to one or more of the other WTRUs that may be involved in the proximity sessions based on other logic, event, and/or configuration. The application server may trigger notifications to one or more of the other WTRUs that may be involved in the proximity sessions using the application layer. The application server may inform the proximity server about a mobility event. The proximity server may forward the notification to one or more of the involved parties, e.g., via the interface supported between the parties and/or the proximity server (e.g., NAS, IP, etc.). The proximity server may inform the MME. The MME may inform the other nodes that may be part of a proximity session.

A WTRU may be configured to send an indication to the MME about the pending mobility event. The MME may receive an indication from a WTRU about a pending mobility event. The MME may recognize local knowledge of the MME about a pending mobility event. The MME may recognize local knowledge, for example, while processing a mobile terminated CSFB request. The MME may send an indication about the pending mobility event to other nodes. The other nodes may include, but are not limited to, the other MME that may be involved in the proximity service, a proximity server, an eNB, an LGW, etc. The MME may send an indication to other nodes about the mobility event using NAS messages. The MME may send an indication to the proximity server about a pending mobility event. The proximity server may use the indication sent by the MME to send an indication to other devices/parties (e.g., other WTRUs in the proximity session and/or the application server) about the possible mobility that may. The proximity server may use indications based on local knowledge about mobility events of a WTRU to send an indication of other devices/parties (e.g., other WTRUs in the proximity session and/or the application server) about the possible mobility that may occur. The proximity server may send an indication to the application server via an interface that may support communication between the two nodes.

A WTRU may be configured to send an indication to the proximity server about the pending mobility event. The proximity server may receive indications about pending mobility events from a WTRU. The proximity server may send an indication to other nodes about the occurrence of the mobility event. For example, an eNB may command the WTRU to perform the inter-system change. The WTRU may receive a command from an eNB to perform the inter-system change. The eNB may be aware of the other WTRUs that may be involved in proximity session with the WTRU for which the mobility event is applicable. The eNB may send an indication of the pending mobility event to the other WTRUs involved in the session and/or to other nodes in the network. For example, the eNB may send RRC messages to the other WTRUs. The eNB may indicate that a WTRU involved in a proximity session is undergoing a mobility event in the RRC message. If the proximity session spans multiple eNBs, the eNB may send indications about the occurrence of the mobility event to the other eNBs involved in the proximity session. The eNB may send an indication to the MME about the mobility command and/or mobility event. The MME may take an action to inform the other WTRUs involved in the proximity session about the occurrence of the mobility event. The MME may send an indication to other WTRUs via a new and/or existing SIAP message. The eNB may send an indication to the MME, for example, for one or more of the mobility events that may occur. The eNB may send an indication about the occurrence of the mobility event to the MME, for example, when it may know that the WTRU has at least one proximity session with other WTRUs (e.g., direct WTRU-to-WTRU transmission, a proximity session via the eNB, etc.). The eNB may send an indication about the occurrence of the mobility event to the MME after the eNB may issue the mobility command. The eNB may send an indication about the occurrence of the mobility event to the MME before the eNB may issue the mobility command, for example based on measurement reports that it may receive from the WTRU. The measurement reports may cause a mobility command to be issued by the eNB.

A WTRU may be configured to send an indication about the occurrence of a mobility event to other WTRUs, e.g., via NAS and/or RRC messages that may be sent directly or via the network nodes. In an example, the WTRU may send an indication via an NAS message about the occurrence of a mobility event to other WTRUs via the MME and/or eNB. In an example, the WTRU may send an indication via an RRC message about the occurrence of a mobility even to other WTRUs via the eNB. The WTRU may send an indication about the occurrence of a mobility event to the MME and/or eNB via NAS and/or RRC messages. The MME and/or eNB may send notifications to other WTRUs, for example, via NAS and/or RRC messages.

A WTRU may be configured to take one or more actions and/or to indicate one or more actions to be performed by other devices or nodes with respect to the proximity session based on the type of mobility event. For example, a pending inter-system change from an LTE network entity (e.g., assuming that the proximity services may be supported via LTE) to another RAT may cause the proximity session to be suspended, terminated, or continued (e.g., via the Internet, via WLAN, etc.). One or more possible actions may be taken when a mobility event is pending. For example, when a mobility event is pending, the proximity service may be suspended. One or more of the nodes involved in the mobility event may be informed about the mobility event and/or the type of mobility event.

In an example, the indication sent by the WTRU may specifically include the action to be performed. The indication sent by the WTRU may include an indication of the type of mobility event and a recipient node may determine the type of action to be taken based on the type of mobility event that is indicated. The WTRU may select an appropriate action based on different criteria, for example such as the type of ProSe session (e.g., direct ProSe session, indirect ProSe session, type of indirect ProSe session such as routed via the RAN, routed via the S-GW, etc.), the type of application (e.g., a public safety application, a gaming type application, a chat application, etc.), the type of mobility event (e.g., intra-eNB handover, inter-eNB handover, intra-RAT handover, inter-RAT handover, CSFB, CSFB for supplementary services, PLMN change, etc.). For example, if the ProSe session is an indirect ProSe communication session where ProSe communication are routed through a RAN node (e.g., an eNB) and the type of mobility event implicates a change in the RAN node servicing the WTRU (e.g., inter-RAT handover, inter-eNB handover, etc.), the WTRU may determine to terminate the ProSe session. If the RAN node is not going to change, the WTRU may determine to continue the session or suspend the session for a limited time in order to complete the mobility event.

A type of mobility event may be delineated to describe different types of mobility procedures, e.g., inter-RAT due to CSFB, inter-PLMN, intra-RAT, etc. A recipient node may be a proximity server, an MME, a WTRU, an eNB, etc. According to the type of mobility event, a recipient node may determine the type of action to be taken. In an example, a WTRU may send an indication including the type of action to be taken to the involved parties and/or devices in the proximity session. The WTRU may send an indication including an action to be taken by the recipient node. The action may delineate when the recipient node may do. For example, a suspend action may inform the recipient node to put the session on hold without deleting the context for this session. The session may be suspended for a time period. The indication sent by the WTRU may include the time period corresponding to the suspension. For example, upon receiving an indication that the ProSe service should be suspended, a recipient node may determine the suspension length based on a timer value included in the indication. In an example, the length of the suspension period timer value may be set or pre-configuration. The timer may be set by the user. The length of the timer may be set by the operator.

The nodes or devices, upon receiving the indication of ProSe session suspension, may maintain the ProSe session context at least until the timer expires. For example, a WTRU may receive an indication from another WTRU that a ProSe session is to be suspended due to a mobility event. The indication may include a timer length. The recipient WTRU may set the timer upon receiving the indication. If the ProSe session is not continued or re-established prior to the expiration of the timer, the recipient WTRU may delete the ProSe context. For example, suspended ProSe sessions may be maintained until the timer expires and/or until an explicit indication is received to delete the context, for example during the time period of the timer. The indication to suspend the ProSe sessions may be sent by the initiating entity that may send the indication, the proximity server, the MME, or the application server, etc.

A WTRU may be configured to resume a ProSe session based on the occurrence of a mobility event. In an example, the ProSe session may be resumed after the return of a WTRU that was involved in the mobility event. A returning WTRU may be configured to send a new indication to the other entities to resume the ProSe session. For example, the WTRU that may complete the mobility procedure associated with the mobility event that triggered the indication may send a second indication to the nodes indicating that the WTRU had returned and that the session may be resumed. The WTRU may send the indication including a signal to resume the ProSe session to the proximity server. The proximity server may notify the other parties and/or device about the WTRU's return and/or the resumption of the session. The WTRU may be configured locally and/or have configurations provided by the network, an MME, an eNB, a proximity server, etc. The WTRU may have configurations for different ProSe sessions. The WTRU may have configurations for different actions that may be performed for different types of mobility events depending on the configuration for a given ProSe session. For example, a given ProSe configuration may indicate whether the session may be suspended during a mobility events and/or whether specific applications may be suspended during a mobility event (e.g., per application). The user may set rules that may define if the sessions may be suspended. For example, the rules may be defined per application.

A WTRU may be configured to continue a proximity service via a WLAN (e.g., WLAN direct or via an AP). A WTRU may be configured to continue a proximity service via a WLAN during a mobility event and/or when a mobility is predicted. An action may be included to indicate to the involved parties that the session may be moved to a WLAN, for example in the indication of the mobility event. A mobility event (e.g., inter-system change) may act as a trigger to continue the proximity session (e.g., via a WLAN). The WTRU associated with the mobility event may indicate one or more WLAN parameter(s) that may be used to continue the session via WLAN and/or enable session continuity. The parameter(s) may be preconfigured and/or known to the network entity (e.g., an MME, a proximity server, etc.). The network entity may forward the parameter(s) that the network entity may send to other nodes (e.g., other WTRUs that may be involved), and/or parameter(s) to continue the session over the WLAN.

A WTRU may be configured to continue a proximity service via the Internet. A WTRU may be configured to determine to terminate a given ProSe session based on the occurrence of certain types of mobility events. For example, a certain class of mobility events (e.g., CSFB) may trigger the WTRU to terminate (e.g., remove the ProSe context) certain types of ProSe sessions and/or continue other types of ProSe sessions (e.g., over the Internet). The mobility procedure may involve establishment of new bearers and/or re-use of existing bearers that may be associated with the PDN connectivity of the WTRU and/or IP address that may be provided by the system. The mobility event indication received by one or more WTRUs may cause the WTRUs to modify packet filters, such that the IP packets for this session may be sent over bearers that may provide connectivity to the Internet.

In addition to sending an indication of the mobility event and/or an indication of the action to be taken in view of the pending mobility event, a WTRU may be configured to send a second indication regarding the ProSe session. For example, the second indication may be sent by the WTRU in order to cancel the previous indication. In an example, if the first indication is sent by the WTRU based on the predicted occurrence of a future mobility event (e.g., based on measurements), the mobility event may remain unexecuted and/or end up not occurring. The WTRU may then send a second indication that communicates that the proximity session may be continued after determining the predicted mobility event is no longer a threat for service disruption. For example, a predicted mobility event may remain unexecuted and/or the proximity session may be continued if there is a CSFB request that may be aborted, a radio link failure, or a failure to perform the inter-system change due to lower layer failures, etc.

The recipient node (e.g., a WTRU that receives the mobility event indication) may be configured to take one or more actions based on the receipt of an indication. The action to be taken by the recipient node may or may not be explicitly included in the mobility event indication received by the recipient node. For example, a recipient WTRU may perform the triggered action (e.g., as indicated in the indication message, via the action information element, etc.), upon reception of the indication about a mobility event. The indication about the mobility event may be received from another WTRU, an MME, an eNB, or a proximity server, etc. In an example, the recipient WTRU may be configured to determine the action to be taken even if the notification message does not explicitly indicate the type of action to be taken. For example, for a given application, the recipient WTRU, upon receiving a mobility event indication, may determine to continue the session over the Internet by establishing and/or modifying one or more bearers associated with the ProSe session, etc. WTRU may be configured to take an action related to proximity sessions during a mobility event based on a per application basis. The WTRUs may take different actions, for each of the applications. The WTRUs may have configurations that may describe the action that may be taken per application when such as indication is received by the WTRU.

The WTRU may be configured to be provisioned by the network (e.g., an MME, an eNB, or a proximity server) with rules and/or configurations about which actions may be taken when a mobility event may be pending and/or occurring. The rules and/or configurations may be defined per application. The action to be taken may depend on whether the mobility procedure has already occurred, is ongoing, or is predicted to occur. For example, if the mobility event is ongoing a WTRU may suspend the session, while if the mobility event has been predicted to occur, the WTRU may attempt to continue the session via the Internet.

The WTRU and/or the network (e.g., an MME, an eNB, or a proximity server) may invoke one or more actions on a per application basis. The WTRU and/or the network may use one or more of the options described herein for actions may be taken when a mobility event may be pending and/or occurring. In an example, for one application the WTRU may suspend a session, while for a second application, the WTRU may device to switch over to WLAN or continue the session over the Internet. In an example, the proximity server may consider the WTRU to be unavailable for proximity service. The proximity server may receive an indication about the WTRU's mobility from the WTRU and/or application server and/or the MME, for example, during the absence of a WTRU due to mobility (e.g., in case of an inter-RAT mobility). The proximity server may keep the WTRU's context for a predetermined or operator determined time period.

The WTRU may be configured to determine an appropriate time for sending an indication regarding a mobility event. For example, the time at which an indication is sent may depend on the type of mobility event. A WTRU may be configured to send the indication, for example, when it receives a mobility command, when it makes a decision to perform an inter-system change due to a command from the RAN, and/or when it makes a decision to perform an inter-system change due to a local decision in the WTRU. The WTRU may send the indication about mobility when a CSFB request is sent. In an example, the WTRU may send an Extended Service Request to the MME to request a mobile originating CSFB request or to accept a mobile terminated CSFB request.

In an MME sends the indication to ProSe WTRUs, the MME may send the indication when it becomes aware of a pending mobility event. For example, if the mobility procedure corresponds to a CSFB, the MME may send the indication after receiving a CSFB request, after accepting a CSFB request from a WTRU, after the MME gets a CSFB request from a mobile switching center (MSC), and/or from a visited location resource (VLR) on a serving gateway (SG) interface, etc. The MME may send the indication to one or more of the nodes when it informs the eNB to perform an intersystem change (e.g., due to CSFB). The eNB may send an indication to the MME and/or other WTRUs when it may issue a mobility command to the WTRU (e.g., handover or an RRC release with redirection or cell change order). The WTRU may send the indication request when it may know about a pending emergency call, for example, via emergency over PS or emergency over CS. Other nodes may send the indication request, for example, if the nodes are aware of an emergency call. In an example, the MME may send an indication request when the WTRU requests an emergency call. An emergency call may be a CSFB for emergency or an IMS emergency bearer service, etc.

In an example, the WTRU (e.g., with respect to CSFB) may be configured to send an Extended Service Request to accept or reject a CSFB request or to request a mobile originating request. The WTRU (e.g., with respect to CSFB) may be configured to include an action in an indication to be performed for one or more of its ongoing proximity sessions. The action may be included in the NAS message that may be sent by the WTRU for CSFB. The MME may take an action to treat the proximity session (e.g., terminate, suspend, move to Internet, etc.), for example, based on the included information in the indication from the WTRU. The indication may state a request to terminate the proximity session. The MME may have rules that may inform how to treat the proximity session per application. The WTRU may be configured to include an action per application in each indication. The WTRU may be configured to send one or more (e.g., different) indications or actions to treat the proximity session differently based on the application type. The recipients of the indications may receive different action type based on the application. Multiple indications may be sent to one WTRU, for example, where each indication may define an action type per application. A WTRU may receive multiple indications where each indication may define an action type per application.

The WTRU may be configured to re-register with the proximity server when it returns back to the LTE network. In an example, the WTRU may be configured to re-register with the proximity server when it returns back to the LTE network if a WTRU performs an intra-LTE-inter-PLMN HO and/or an inter-RAT HO. The WTRU may re-register with the MME. The MME may inform the proximity server that the WTRU is back in the system. The return of the WTRU may trigger the proximity server to re-assign any proximity identifies that it may provide to the WTRU. The proximity server may inform other nodes that the WTRU is back. Other nodes may include, but are not limited to, other WTRUs, other proximity servers, application server, etc. The proximity server may inform other nodes that the proximity services may be re-started. The WTRU may perform a tracking area update (TAU) to inform the MME about its return, for example if idle mode signaling reduction (ISR) between the WTRU and the network is active. The MME may be configured to notify the proximity server about the WTRU's return. If a proximity session is switched to a WLAN during an inter-RAT HO, the WTRU may be configured to switch a session from the WLAN back to LTE, for example, based on operator policies, network indications, WTRU configurations, etc.

The WTRU may be configured to detect a mobility event. The WTRU may be configured to determine the type of mobility event pending and/or occurring. In an example, the WTRU may be configured to determine if a mobility event is an inter-system change due to CS services. The WTRU may be configured to determine if a mobility event is an inter-system change due to a CSFB. The WTRU may be configured to determine if a mobility event is an inter-system change due to CS supplementary services. The WTRU may be configured to determine if a mobility event is an intra-RAT HO. The WTRU may be configured to determine if a mobility event is an inter-RAT HO. The WTRU may be configured to determine if a mobility event is an inter-PLMN HO. The WTRU may be configured to determine if a mobility event is an inter-PLMN HO with intra-RAT. The WTRU may be configured to determine if a mobility event is an inter-PLMN HO with inter-RAT HO. The WTRU may be configured to determine if a mobility event is a Wi-Fi offload. The WTRU may be configured to determine if a mobility event is a Wi-Fi offload at an IP flow level. The WTRU may be configured to determine if a mobility event is a Wi-Fi offload at a bearer level. The WTRU may be configured to determine if a mobility event is a Wi-Fi offload moving each of the PDN connections. The WTRU may be configured to determine if a mobility event is a network assisted cell change order.

The WTRU may be configured to determine the type of ProSe session implicated by the mobility event. The WTRU may be configured to determine if the ProSe session is a direct ProSe session. The WTRU may be configured to determine if the ProSe session is an indirect ProSe session.

The WTRU may be configured to determine the type of application involved in the ProSe session. The WTRU may be configured to determine if the application is a chat application. The WTRU may be configured to determine if the application is a game application. The WTRU may be configured to determine if the application is a search application. The WTRU may be configured to determine if the application is a mail application. The WTRU may be configured to determine if the application is a social media application. The WTRU may be configured to determine if the application is a news application.

The WTRU may be configured to determine the action to be taken on the application involved in the ProSe session. The WTRU may be configured to determine if the action to be taken is to suspend the ProSe session. The WTRU may be configured to determine if the action to be taken is to suspend the ProSe session, for example, if the mobility event is a CSFB. The WTRU may be configured to determine if the action to be taken is to suspend the ProSe session, for example, if the mobility event is an inter-RAT due to CSFB. The WTRU may be configured to determine if the action to be taken is to suspend the ProSe session, for example, if the mobility event is an inter-PLMN handover. The WTRU may be configured to determine if the action to be taken is to suspend the ProSe session, for example, if the mobility event is an inter-RAT handover. The WTRU may be configured to determine if the action to be taken is to suspend the ProSe session, for example, if the mobility event is an intra-RAT handover. The WTRU may be configured to determine if the action to be taken is to continue the ProSe session via WLAN. The WTRU may be configured to determine if the action to be taken is to continue the ProSe session via WLAN, for example, if the mobility event is an inter-system change. The WTRU may be configured to determine if the action to be taken is to continue the ProSe session via the Internet. The WTRU may be configured to determine if the action to be taken is to continue the ProSe session via the Internet, for example, if the mobility event is a CSFB. The WTRU may be configured to determine if the action to be taken is to terminate the ProSe session.

The WTRU may be configured to determine the node(s) to be informed of the action taken on the ProSe session. The WTRU may be configured to determine if the eNB should be informed of the action to be taken on the ProSe session. The WTRU may be configured to determine if the eNB should be informed of the action to be taken on the ProSe session, for example, if the ProSe session is an indirect ProSe session. The WTRU may be configured to determine if the proximity server should be informed of the action to be taken on the ProSe session. The WTRU may be configured to determine if the proximity server should be informed of the action to be taken on the ProSe session, for example, if the action to be taken is to terminate the ProSe session. The WTRU may be configured to determine if the proximity server should be informed of the action to be taken on the ProSe session, for example, if the action to be taken is to suspend the ProSe session. The WTRU may be configured to determine if the proximity server should be informed of the action to be taken on the ProSe session, for example, if the action to be taken is to continue the ProSe session via WLAN. The WTRU may be configured to determine if the proximity server should be informed of the action to be taken on the ProSe session, for example, if the action to be taken is to continue the ProSe session via the Internet. The WTRU may be configured to determine if the proximity server should be informed of the action to be taken on the ProSe session, for example, if the application involved is a social media application. The WTRU may be configured to determine if the proximity server should be informed of the action to be taken on the ProSe session, for example, if the application involved is a news application. The WTRU may be configured to determine if the proximity server should be informed of the action to be taken on the ProSe session, for example, if the application involved is a game application. The WTRU may be configured to determine if the proximity server should be informed of the action to be taken on the ProSe session, for example, if the ProSe session is an indirect ProSe session. The WTRU may be configured to determine if the MME should be informed of the action to be taken on the ProSe session. The WTRU may be configured to determine if the MME should be informed of the action to be taken on the ProSe session, for example, if the ProSe session is an indirect ProSe session. The WTRU may be configured to determine if one or more WTRUs should be informed of the action to be taken on the ProSe session. The WTRU may be configured to determine if one or more WTRUs should be informed of the action to be taken on the ProSe session, for example, if the action to be taken is to suspend and/or terminate the ProSe session and the application involved in the ProSe session is a chat application. The WTRU may be configured to determine if one or more WTRUs should be informed of the action to be taken on the ProSe session, for example, if the action to be taken is to suspend and/or terminate the ProSe session and the application involved in the ProSe session is a game application. The WTRU may be configured to determine if the proximity server should be informed of the action to be taken on the ProSe session, for example, if the ProSe session is a direct ProSe session.

Congestion control and/or mitigation may be defined at one or more levels to allow for efficient resource allocation to enable signaling related to ProSe communications. One level may be referred to as access point name (APN) based congestion. A WTRU may receive a notification (e.g., via NAS signaling) that there is congestion at a particular APN, for example in APN based congestion. The WTRU may be configured to receive a backoff timer. The WTRU may be configured to refrain from sending a session management or other NAS requests corresponding to the congested APN during the lifetime of the backoff timer (e.g., until the backoff timer expires). The WTRU may be configured to refrain from requesting bearer establishment and/or bearer modification procedures for the corresponding APN while the backoff timer is running.

For example, while the backoff timer is running, the WTRU may be configured to refrain from requesting changes to accommodate IP sessions that would result in the establishment of new bearers. New bearers may include bearers associated with the APN. The WTRU may be configured to refrain from sending session management requests that may involve signaling towards the APN. The WTRU may be configured to refrain from sending session management requests that may involve signaling towards the packet data network gateway (PDN GW) that may connect to the APN. However, in the presence of proximity services, use of APN based backoff timers may result in inefficient congestion control and/or mitigation, for example, since proximity services may involve data that may be communicated via the eNB, MME, etc. without directly involving the APN. A modified WTRU backoff, for example, where the WTRU may be configured to send proximity session requests (e.g., when an APN is congested), may be utilized to control congestion and/or mitigate traffic.

For example, a backoff mechanism may be utilized to handle WTRU actions in a more granular fashion while the timer is running. As an example, the MME and/or SGSN may indicate backoff and/or APN congestion for Internet services during an APN congestion. The WTRU may receive the backoff indication. The WTRU may refrain from sending requests that implicate the congested APN during the indicated backoff period, but the WTRU may still be allowed to send session management requests for proximity services. The backoff indication (e.g., using a code at the NAS messaging level) and/or a message may indicate whether a WTRU may send management requests. The WTRU may be allowed to send session management requests for proximity sessions that may involve network nodes other than the PDN GW, for example, the MME. Allowing the WTRU to send proximity based requests to the MME during the backoff period in order to set up resources and handle session management requests, while stopping the WTRU from attempting to access the APN, may allow for the continuation of ProSe sessions while avoiding further congestion at the PDN GW (e.g., APN).

A WTRU may be configured to receive from the MME and/or SGSN an indication including a backoff timer during which one or more services (e.g., proximity services) may be allowed. The MME and/or SGSN may indicate a backoff timer during which one or more other services, such as PDN GW access, may be disallowed. A WTRU may be configured to receive a backoff mechanism that may contain indications including the type of messaging that is still allowed during the backoff period. For example, the indications may delineate that a subset of transmission schemes/procedures and/or a subset of NAS signaling may be disallowed, while other signaling/procedures may be allowed. For example, the MME, SGSN, and/or other CN node(s) may indicate that certain transmissions may be prohibited, e.g., for a time period. For example, transmission of data over user plane may be prohibited, while transmission over the control plane (e.g., NAS or other control plane in RRC) may be allowed, or vice versa. The WTRU may be configured to receive indications from the MME, SGSN and/or other CN node(s). The MME, SGSN, and/or other CN node(s) may also provide a list of applications in the indications that may be associated with the indication of backoff and/or backoff method. For example, the backoff indication and/or command may be applicable to a set of applications and/or services as delineated by the network (e.g., NAS or RRC) and/or as per local configurations and/or settings in the WTRU. The backoff may be applicable to non-ProSe services signaling. A WTRU may be configured to conduct ProSe signaling during the backoff period.

A WTRU may be configured to transmit an identity and/or code on the radio, for example, for the purpose of broadcasting the support of a particular application instance. A code may be dedicated or correspond to a specific application. A WTRU may be configured to be able to discover that there is a WTRU in proximity that is executing an instance of a specific application and detect the broadcast code. For example, the code may include (e.g., embedded in the code) information about the user and/or applications being executed on the WTRU associated with the user. For example, assuming a user named FirstName LastName is using an application called TestApplication, a code transmitted on the radio may be decoded and interpreted as FirstName.LastName@TestApplication, which may imply that the WTRU is running a TestApplication application and the user name of the TestApplication application user is FirstName LastName. The WTRU may be configured to receive the code. The WTRU may be configured to utilize the code to detect other WTRUs that may be running the specific username/application combination. A WTRU may have one or more applications running. As an example, the WTRU may be configured to perform N transmissions (e.g., where N is an integer corresponding to N applications in the WTRU) of codes on the radio. The WTRU may perform the N transmissions to allow for other WTRUs to discover which applications and users are being executed at the WTRU, for example, with broadcast and discovery method. A WTRU may contain a priority level for each application, e.g., based on user and/or operator preferences. A WTRU executing multiple applications may experience contention between multiple applications for use of radio resources. A WTRU experiencing contention between multiple resources may be configured to trigger an attempt to use radio resource for broadcasting a specific code. For example, the specific code broadcast by the WTRU may indicate that multiple applications are contending for the radio resources and/or indicate the identity of the applications contenting for the radio resources.

A WTRU may be configured to utilize a priority to determine when to use radio resource when broadcasting code for discovery. A WTRU may have limited resources for transmitting a code and/or identity on the radio to enable others to discover applications for which WTRUs may want to engage in proximity sessions. A WTRU may have multiple applications, for example, which may be configured for transmission of an identity and/or code on the radio resources for other WTRUs to discover. A WTRU may be configured to transmit application specific identities and/or codes, for example, to enable an efficient way for the WTRU to to use the limited resources in such a way that the user's requirements are met with respect to the applications. A WTRU may be configured to take turns transmitting identities that may be specific to an application. A WTRU may be configured to send an NAS layer message providing the lower layers (e.g., an RRC) with a list of identities to broadcast. A WTRU may be configured to utilize the lower layers to broadcast the lower identities in an ordered manner until the list may be exhausted. The order may be provided by the NAS to the lower layers.

A WTRU may be configured to utilize an NAS layer that may have a priority for broadcasting different codes and/or indications regarding applications based on user settings. For example, the user may have priorities for applications' usage of resources via the user interface. The user may rank the applications with certain priorities. A WTRU may be configured to transmit the applications that are ranked higher at a higher frequency of transmission of the corresponding identities by the lower layers. For example, an application that may be ranked as having the highest priority may be transmitted by the WTRU twice as much compared to the application that may be have lower priority. A WTRU may treat one or more applications having the same priority level similarly. While broadcasting an identity, the WTRU may broadcast the identities of the same priority. The WTRU may broadcast the identified N times, where N may be an integer that may be configured in the WTRU and/or by the network via an NAS, an RRC, an ANDSF, an OTA, etc. The WTRU may broadcast identities that may belong to a lower priority level. The application identities may be prioritized in one or more ways.

A WTRU may be configured to receive a priority level per application from the network, e.g. an MME, an eNB, a proximity server, based on network policies, subscription, application provider settings, etc. For example, an application provider may pay a premium for an application that may have more resources for broadcasting proximity related identities. The user may be charged for changing the default priority levels.

The WTRU may be configured to send an indication to the network, e.g., an eNB, an MME, or a proximity server, when the WTRU may desire to change the priority level for an application. In an example, the WTRU may send an indication to the network when it may desire to change the priority level for its application because the network may have to approve the use of the limited resources according to the WTRU's request and/or change, for example if the change of the priority is granted. The WTRU may be configured to send a list of priorities to the network indicating the relative priority the WTRU would like to assign to the listed applications. The WTRU may wait for a response from the network. The network may approve or disapprove of the requested priority levels. The WTRU may be configured to receive approval or disapproval for change in resources from the network. A change of priority level at the NAS may trigger a notification to the RRC with the updated priority level. The WTRU may be configured to exchange priority levels per application with the network, for example, using NAS, RRC, or other higher layer signaling messages including, but not limited to, ANDSF, OMA DM, OTA, SMS, etc.

The priority levels and/or rules may vary depending on whether the WTRU is in its home PLMN or in a visited PLMN. The visited PLMN and/or local proximity server (e.g., in the visited PLMN) may fetch the home PLMN's preferences and may make a final decision on how to prioritize the applications, for example when the WTRU is in a visited PLMN. The visited PLMN may provide the prioritized list to the WTRU. The WTRU may be configured to receive the prioritized list from the visited PLMN. The WTRU may use the prioritize list locally, for example, to allocate broadcasting resources per application.

The WTRU may be configured to determine to suppress one or more applications from using the radio resources for a period of time, for example, based on a user setting via the user interface. The WTRU may be configured to determine to suppress one or more applications from using the radio resources for a period of time, for example, as a result of a new indication from the proximity server and/or the network, e.g., an eNB, an MME, etc. The WTRU may be configured to change its priority for applications. The WTRU may be configured to change its priority for applications once every N seconds, where N may be an integer that may be determined by the network, provided via NAS message, via RRC messages, preconfigured in the WTRU, provided to the WTRU via ANDSF, OMA DM, SMS etc., and/or the like. The WTRU may be configured to wait a duration before a change of priority levels may be implemented by the WTRU.

A WTRU may be configured to perform load balancing of network resources among one or more WTRUs. One or more WTRUs may suffer from a loss of network coverage due to one or more reasons, such as an inter-system change due to CS services (e.g., CSFB or supplementary services), an intra-RAT handover (HO), an inter-RAT HO, an inter-PLMN HO (e.g., with intra-RAT or inter-RAT HO), a Wi-Fi offload (e.g., at an IP flow level or a bearer level or moving each of the PDN connections), network assisted cell change order, etc. A WTRU (e.g., a public safety WTRU) may be configured to act as a relay for the out of coverage WTRUs. The relay WTRU may be in coverage of the network. The relay WTRU may act as a master WTRU within a group of WTRUs. The relay WTRU may act as a bridge between WTRUs that may be under the relay WTRU's control. The relay WTRU may act as a bridge by relaying information between WTRUs that may be part of the group. One or more relay WTRUs may be utilized. For example, a first relay WTRU may be configured to control (e.g., relay information to/from) one or more WTRUs such that the first relay WTRU may be unable to handle and/or admit a new WTRU. The first relay WTRU may be configured to send an indication to a connecting WTRU that may wish to be admitted that resources may be unavailable (e.g., momentarily). A second relay WTRU may be present in the vicinity that may be known to the first relay WTRU but the connecting WTRU may be unaware of the second relay WTRU. The second relay WTRU may have the capability and/or capacity to admit the connecting WTRU. The first relay WTRU may refer the connecting WTRU (e.g., the incoming WTRU) to a second relay WTRU, for example, so that load balancing may be achieved amongst the relay WTRUs, e.g., the first relay WTRU and the second relay WTRU.

A relay WTRU may be configured to admit and/or control a certain number of WTRUs that may require a service. A first relay WTRU may be configured to refer a connecting WTRU that may request admission to a second relay WTRU in vicinity, for example, to enable load balancing and/or avoid congestion. The first relay WTRU may be aware of a second WTRU that may act as a second relay WTRU. The first relay WTRU may be configured to recognize a second WTRU that may act as a second relay WTRU. The first relay WTRU may be configured to recognize and/or acknowledge the capacity to admit connecting WTRUs of the second relay WTRU. The first relay WTRU may indicate to the second relay WTRU that it may refer a connecting WTRU to the second relay WTRU. The second relay WTRU may acknowledge the first relay WTRU's request. The first relay WTRU may indicate to the connecting WTRU that it may request admission to another WTRU. The first relay WTRU may indicate to the connecting WTRU that it may try connecting with a referred second WTRU. The first relay WTRU may provide one or more parameters to the connecting WTRU to facilitate connection with the second relay WTRU. The second relay WTRU may provide to the first relay WTRU the parameters that may help the admitted WTRU to get the service it may request. The first WTRU may receive the parameter from the second relay WTRU. The parameters may include, for example, a password that may be verified by the second relay WTRU to ensure that the connecting WTRU requesting admittance is a valid WTRU, lower layer configurations for connection, WLAN parameters (e.g., in case of a WLAN connection), etc. The messages exchanged between the relay WTRUs and the connecting WTRU may be implemented as NAS and/or RRC messages.

An eNB may be configured to facilitate scheduling communications associated with the ProSe connection. In the ProSe connection path that includes an eNB, the eNB may be configured to receive and/or forward application data packets over Data Radio Bearers (DRB) between two WTRUs. The communication path may be formed without involving other core network node(s). The eNB may differentiate ProSe data from other application traffic, for example, by performing Deep Packet Inspection (DPI). The eNB may perform DPI when the DRB may be dedicated to non-ProSe communication. The eNB may perform DPI when the ProSe traffic may be mixed with other application data on the same DRB (e.g., the other application data may be routed via the core network). To avoid DPI, which may be an unwanted processing burden for the eNB, an eNB may utilize a dedicated DRB for ProSe traffic.

An eNB may be configured to initiate the creation of a dedicated DRB for ProSe traffic. The dedicated (e.g., new, fresh) DRB may be created due to a service request (e.g., from a WTRU) for a ProSe application. The dedicated (e.g., new, fresh) DRB may be created to move a traffic from normal Evolved Packet Core (EPC) path to the ProSe path involving the eNB. The creation of a dedicated DRB may be performed without the use of each of the typical procedures of establishing an EPS bearer. For example, rather than utilizing previous EPC QoS framework that establish a QoS metrics configuration for the bearer (e.g., Priority Bit Rate (PBR) or Bucket Size Duration (BSD), etc.), the QoS parameters for the ProSe DRB may be left to eNB implementation. The eNB may be unable to guaranteed the optimal settings of QoS metrics, for example, because the eNB may be unaware of the QoS requirements of the ProSe applications and/or the priority relationships between ProSe traffic and other application traffics.

In an example, one or more core network (CN) nodes may be configured to achieve WTRU to WTRU dedicated bearer establishment. For example, WTRU to WTRU dedicated bearer may be established when the WTRU sends a request for the proximity connection to the network, among other scenarios. The MME may be configured to receive the request for the proximity connection from the WTRU. The MME may be configured to establish bearers towards two or more WTRUs that may wish to establish the proximity connection. Core network nodes other than the MME may initiate the standard dedicated bearer establishment procedure. The MME, among other nodes, may be configured to introduce logic, techniques and corresponding signaling that may be exchanged between various network nodes and the WTRU to establish WTRU to WTRU dedicated bearer(s). The WTRU to WTRU dedicated bearer(s) may be used by the proximity WTRU for exchanging direct WTRU to WTRU data.

The MME may be configured to send the request for proximity connection to the proximity server, for example, when the MME receives the request to setup a proximity connection by at least one of the proximity WTRUs. The MME may establish the dedicated bearer using the network based dedicated bearer establishment procedure. The MME may establish the dedicated bearer for the proximity service and/or based on the response from the proximity server. In some examples, proximity services may utilize non-dedicated bearers for proximity services and thus network based dedicated bearer establishment procedure may not support the establishment of dedicated bearer for proximity service.

In other examples, a dedicated bearer may be established for one or more proximity services to balance and facilitate ProSe traffic.

An eNB may be configured to schedule ProSe connections. An eNB may be configure to facilitate the use of a dedicated DRB for ProSe connection. The CN nodes other than the eNB may set the arbitrary QoS metrics and/and priorities for a ProSe DRB. The eNB may be configured to receive arbitrary QoS metrics and/and priorities for a ProSe DRB from CN nodes. The eNB may use the indication(s) from the WTRU to decide the priority and/or resource grant for the ProSe DRB. The WTRU may indicate the scheduling requirements. The eNB may receive the scheduling requirements from the WTRU.

A corresponding logical channel may be configured as a single Logical Channel Group (LCG), for example if a dedicated DRB is created for ProSe connection via eNB. The logical channel for the ProSe traffic and the logical channels for other non-ProSe traffic may be configured in different LCG (e.g., not the same LCG). Multiple ProSe traffic via an eNB may be ongoing at the same time, on the same DRB, on separate DRBs, etc. The corresponding logical channels may be configured in a different LCG and/or in the same LCG, for example, if the corresponding logical channels are on separate DRBs. There may be a limitation of the LCG ID space, for example, if corresponding logical channels may be configured in the same LCG.

The Buffer Status Report (BSR) may reflect the buffer size of the ProSe traffic, for example, by assigning a ProSe logical channel a dedicated LCG ID. The eNB may be configured to grant resources to the BSR and/or the like, for example, by assigning a ProSe logical channel a dedicated LCG ID.

The WTRU may be configured to use long BSR format to schedule ProSe communication via the eNB. Long BSR format may indicate that the BSR includes a buffer size of various LCGs. The order of the LCG ID in the BSR may indicate the priority of the corresponding logical channels, for example, when long BSR format is used. The WTRU may be configured to construct a BSR and/or put the LCG ID of the ProSe channel in the beginning of the BSR, for example, if the WTRU considers ProSe traffic a higher priority. The WTRU may be configured to put the LCG ID of the ProSe channel at the end of the BSR, for example, if the WTRU considers it a lower priority.

The WTRU may be configured to use short BSR format to schedule ProSe communication via the eNB. The short BSR may include (e.g., may only include) the buffer size of the ProSe channel. The short BSR may be used to ensure that ProSe traffic may be scheduled before other traffic, for example, if the ProSe traffic is considered a higher priority than other traffic. The short BSR may be used to ensure that ProSe traffic may be scheduled before other traffic even when the long BSR may be used according to current MAC specification.

A dedicated DRB may be configured for ProSe communication via eNB. Other DRBs may exist. The resource distribution among DRBs may follow the rules and/or parameters, for example, for when there is a scheduling grant from the eNB.

The eNB may be configured to allocate resources to ProSe and non-ProSe traffic based on priority levels. The WTRU may identify the ProSe traffic as a higher priority. The WTRU may indicate in the BSR the priority of the ProSe traffic. The scheduling grant size for ProSe traffic may be larger than the buffer size ("a") of a ProSe channel previously reported. The WTRU may be configured to distribute the amount of "a" to the ProSe channel. The WTRU may be configured to distribute the remainder of the resource to other logical channels, for example, in accordance with the Logical Channel Prioritization (LCP) procedure in the 3GPP TS 36.321 document. The scheduling grant size for the ProSe traffic may be smaller than the buffer size ("a") of the ProSe channel previously reported. The WTRU may be configured to distribute one or more or all the scheduled resource(s) to the ProSe channel.

The WTRU may identify ProSe traffic as a lower priority. The WTRU may indicate in the BSR the priority of the ProSe traffic. The Priority Bit Rate of one or more or all logical channels (e.g., including the ProSe channel) may be satisfied, for example by following the LCP procedure in the 3GPP TS 36.321 document. The WTRU may be configured to implement the PBR of the ProSe channel. The eNB may be configured to form the PBR of the ProSe channel.

One or more resources may remain after the PBRs of one or more or all channels are satisfied. The WTRU may distribute resources among channels, for example following the LCP procedure in the 3GPP TS 36.321 document. For example, the resource may be assigned to the channels according to their priorities.

Figure 5:
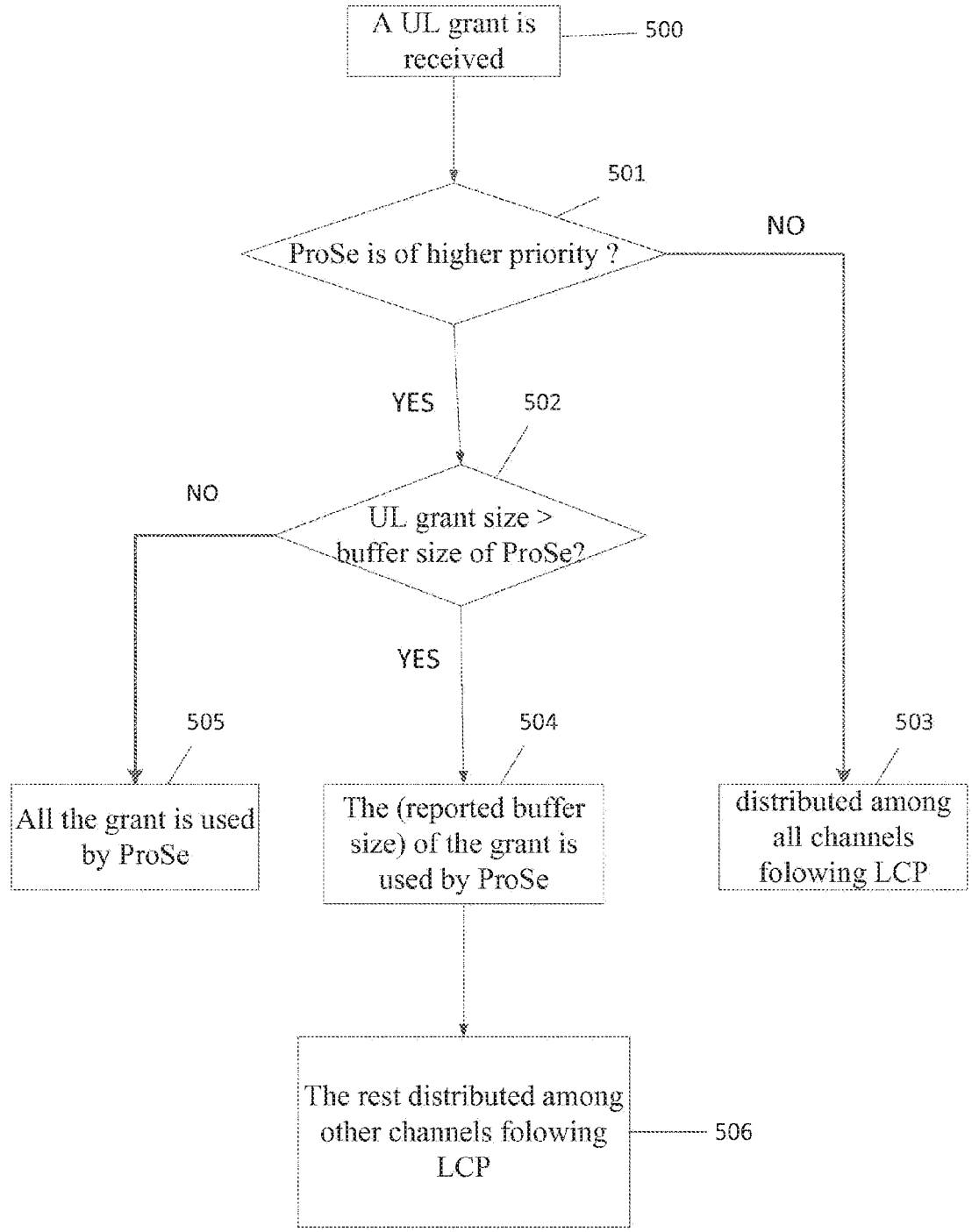
FIG. 5 is a flow chart of an example technique for scheduling for a ProSe connection.

FIG. 5 depicts a flow chart of an example technique for scheduling for a ProSe Connection. In 500, an uplink grant may be received by the eNB from the WTRU and/or the network. In 501, the eNB determines the ProSe priority level. If the eNB determines ProSe priority is of lower priority level, in 503, the WTRU may distribute resources among all channels following LCP. If the ProSe priority is of higher level, in 502, the eNB determines if the uplink grant size of resources is greater than the buffer size of the ProSe. If the eNB determines the uplink grant size of resources is less than the buffer size of the ProSe traffic, in 505, the WTRU may distribute all of the resources of the ProSe traffic. If the eNB determines uplink grant size of resources is greater than the buffer size of the ProSe, in 504, the WTRU may distribute the reported buffer size of the grant of resources to the ProSe. If the eNB determines there are additional resources remaining in the grant of resources, in 506, the WTRU may distribute the remaining resources among other channels following LCP. The eNB may be configured to include an indication in the logical channel configuration signaling, for example to enable the WTRU to understand which logical channel may be dedicated to the ProSe traffic.

The eNB may be configured to use a dedicated DRB to identify flow for ProSe traffic. The use of a dedicated DRB for ProSe traffic may enable an eNB to avoid using Deep Packet Inspection (DPI) for ProSe traffic. For example, a ProSe application traffic may be initially carried over EPC bearers that may carry both ProSe and non-ProSe application data. The ProSe traffic may be transferred to the ProSe path via eNB. The eNB may be unable to reconfigure a dedicated DRB for the ProSe traffic, for example, due to additional signaling or if the traffic may be switched back to the normal EPC path.

Figure 6:
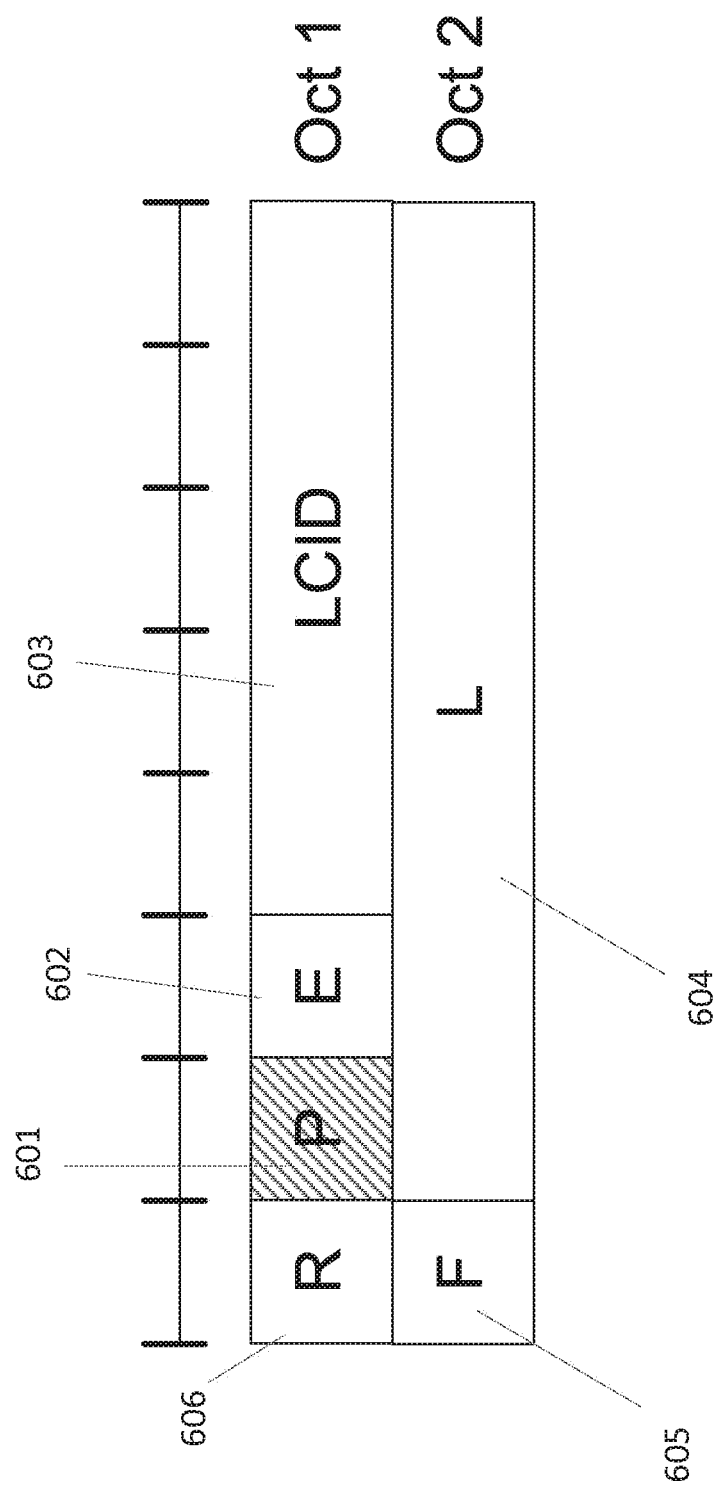
FIG. 6 is an illustration of an example of a flag bit in a header for indication that a corresponding MAC-SDU is for ProSe traffic.

FIG. 6 is an illustration of an example of a flag bit in a header for indication that a corresponding MAC-SDU is for ProSe traffic. The ProSe traffic may share the same DRB and/or EPS bearer with other non-ProSe traffic. The WTRU may be configured to indicate whether a UL transmission is for ProSe and/or non-ProSe data. The WTRU may include the indication in any layer of the protocol stack, for example at the IP, PDCP, RLC, MAC, or a combination thereof. For example, the WTRU may add the indication in the corresponding Medium Access Control (MAC) sub-header for that logical channel. The WTRU may utilize some reserved flag bit. For example, as illustrated in FIG. 6, at 601, a "P" flag bit in the header may be used to indicate the corresponding MAC-Service Data Unit (SDU) is for the ProSe traffic. In FIG. 6, 600 is an example if a MAC Protocol Data Unit. If resources are present, a MAC PDU 600 may be generated by a MAC layer. In FIG. 6, the MAC PDU may include pending data available for transmission and/or BSR MAC control element (CE). The MAC PDU may consists of a MAC header, zero or more MAC Service Data Units (MAC SDU), zero, or more MAC Control Elements (CEs). Both the MAC header and the MAC SDUs are of variable sizes. A MAC PDU header consists of one or more MAC PDU subheaders. Each subheader consists of the six header fields R 606, P 601, E 602, LCID 603, F 605, and L 604. MAC PDU subheaders may have the same order as the corresponding MAC SDUs, MAC control elements. The LCID field 603 is a Logical Channel ID field. The LCID field may identify a logical channel instance of a corresponding MAC SDU or a type of a corresponding MAC control element or padding for Downlink Shared Channel (DL-SCH), Uplink Shared Channel (UL-SCH) and Multicast Channel (MCH).

The RLC entity may ensure that an RLC-PDU contains non-concatenated RLC-SDUs of the ProSe data with other non-ProSe RLC-SDUs, for example to ensure one MAC-SDU carries the ProSe data (e.g., only ProSe data) separate from other application data on the same LC. One or more indications may be added in the primitives that may be used between the entities such as PDCP, RLC, and/or the MAC entity, for example, to assist the layers with identifying ProSe data from non-ProSe data. The PDCP may indicate, for example to at least the entity below it (RLC), that the PDCP SDU is carrying ProSe application data. The PDCP may indicate that the PDCP SDU is carrying ProSe application data by defining (e.g., previously undefined for such a purpose) primitives (e.g., new primitives) across the layers. Other primitives may be defined between other layers. The primitives may be used for DL and/or UL traffic. For example, when the RLC layer knows that data received and/or processed is for ProSe data, the RLC may indicate that the data is for ProSe data (e.g., by using a new primitive) to the PDCP layer when forwarding the data.

The WTRU may be configured to enforce a transmission to contain ProSe data or non-ProSe data (e.g., only ProSe or non-ProSe data). The WTRU may indicate to the eNB whether the transmission (Tx) is for a ProSe or a non-ProSe application. The eNB may be configured to recognize (e.g., may always know) if a Tx is for a ProSe or non-ProSe application.

Figure 7:
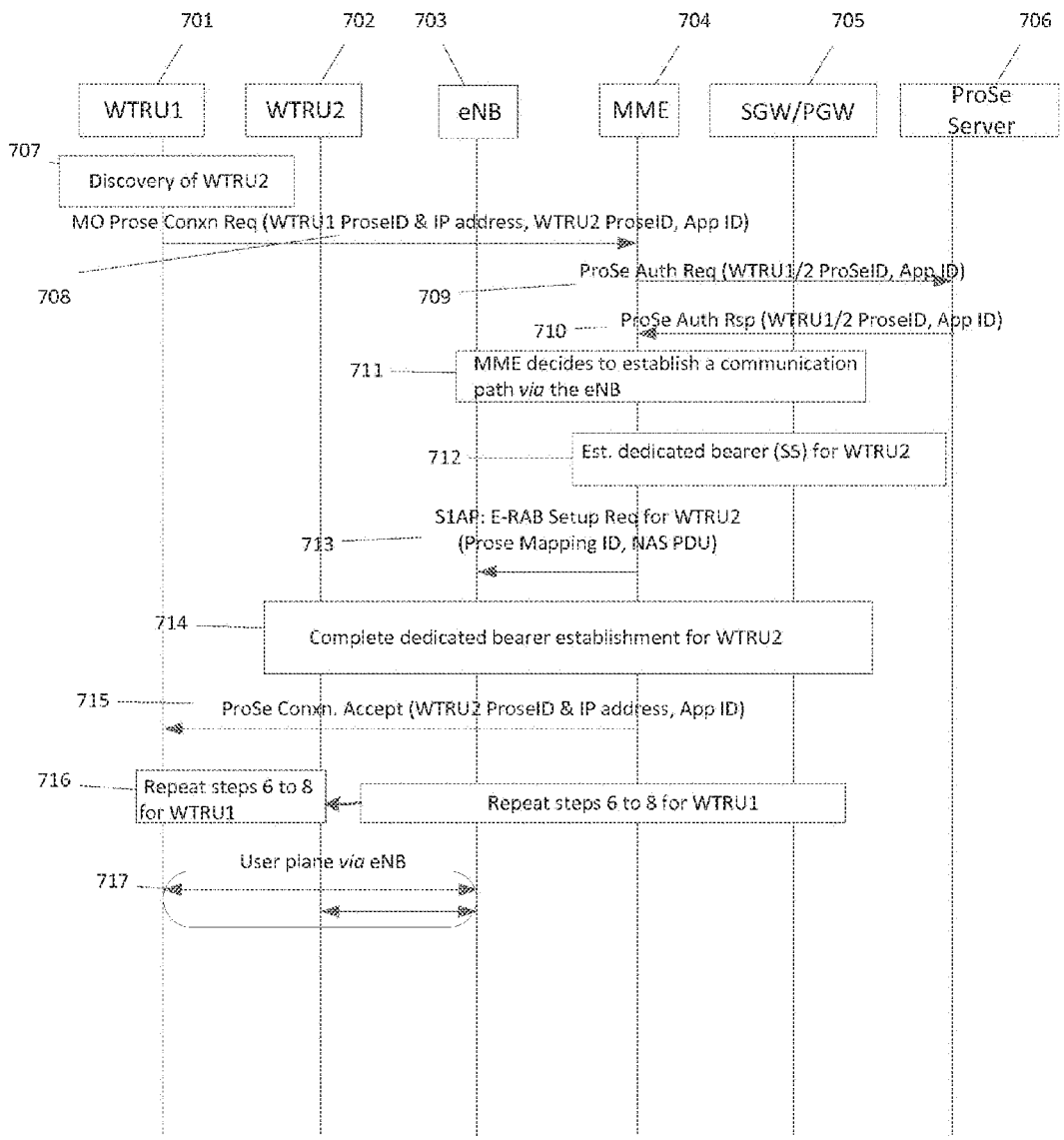
FIG. 7 illustrates an example of an MME initiated dedicated bearer establishment technique for a proximity connection.

FIG. 7 illustrates an example of an MME initiated dedicated bearer establishment technique for the proximity connection, for example when the MME may receive a proximity connection request from at least one of the WTRUs involved. The MME may be configured to initiate ProSe local path bearer establishment. The WTRU may send a request for the proximity connection to the network. The MME may receive the request for proximity connection from the WTRU. The MME may be configured to setup bearers towards two or more WTRUs that may wish to establish the proximity connection. The MME may establish a ProSe Communication path via an eNB for proximity connection when the MME receives proximity connection request from one or more of the WTRUs involved in the ProSe session.

In FIG. 7, at 707, WTRU1 701 and WTRU2 702 may be in ECM-connected mode and may have discovered each other. At 707, WTRU1 701 may have discovered WTRU2 702. At 708, WTRU1 701 may send an NAS request and/or MO ProSe Connection Request to the MME 704. The NAS request and/or MO ProSe Connection Request may include WTRU1's 701 ProSeID and IP address and/or other parameters that may be used for this session, the ProSeID of WTRU2 702, and/or the application identity. The NAS request and/or MO ProSe Connection Request may indicate that WTRU1 701 may wish to establish a ProSe session with WTRU2 702. The message may also include the Linked Bearer Identity (LBI) of the ProSe PDN connection of the WTRU, and/or the traffic aggregate description (TAD) of the IP sessions between WTRU 701 and WTRU 702, and/or requested QoS. At 709, the MME 704 may request the ProSe Server 706 to perform authorization for this session (e.g., for the ProSeID of WTRU1 701 and WTRU2 702, and/or the application identity). At 710, the ProSe Server 706 may inform the MME 704 that the session is authorized for WTRU1 701 and WTRU2 702 for the given application. The ProSe server 706 may return traffic aggregate description (TAD) and/or required QoS for the communication between WTRU1 701 and WTRU2 702. The MME 704 may construct TAD/Required QoS for WTRU1 701 and WTRU2 702 based on the information received at 707. The MME 704 may use the IP address of WTRU2 702 provided to the MME 704 by WTRU1 701 to derive the LBI of the corresponding PDN connection for WTRU2 702. At 711, the MME 704 may establish a communication path via the eNB 703. The connection path may be based on local configurations and/or knowledge that WTRU1 701 and WTRU2 702 may be served under the same eNB 703. The connection path may be based on an indication from the ProSe Server 706, etc. At 712, the MME 704 may start the establishment of a bearer towards the SGW/PGW 705 using, for example, steps described in 3GPP TS 23.401, for example steps 2-4 of Section 5.4.5-1 and steps 10-12 of Section 5.4.1-1. 712 may later be used to enable session continuity via the infrastructure path. The MME 704 may add an indicator to the GTP-C Bearer Resource Command to indicate Policy & Charging Enforcement Function (PCEF) and/or Bearer Binding and Event Reporting Function (BBERF), such that the bearer binding function may create a new bearer. At 713, the MME 704 may continue to establish the S1 bearer towards the eNB 703 by sending an S1AP E-RAB Setup Request message to the eNB 703. The MME 704 may include a "mapping ID" that may indicate this bearer is for the communication path via the eNB 703. The NAS PDU (Activate Dedicated EPS Bearer Context Request) may be sent by the eNB 703 to WTRU2 702. At 714, the eNB 703 may send an RRC connection reconfiguration message to WTRU2 702 to establish the radio bearer for the communication path via the eNB 703. The WTRU2 702 may complete the procedure by sending the RRC connection reconfiguration complete. The eNB 703 may complete the establishment of the S1 bearer by sending the S1AP E-RAB Setup Response message. The MME 704 may complete the establishment of the bearer towards the SGW/PGW 705, for example, as described in 3GPP TS 23.401 document, for example steps 10-12 of section 5.4.1-1. At 715, the MME 704 may respond to WTRU1 701 with an NAS message (e.g., ProSe Connection Accept) that may include the ProSeID, IP address, other parameters, and/or the application identity, etc. of the WTRU2 702. At 716, the MME 704 may set up a bearer for WTRU1 701, for example, as described in 712, 713 and 714. The MME 704 may provide the same or similar "mapping ID" as the MME 704 provided in 713, for example, when requesting the eNB 703 to setup an E-RAB for WTRU1 701.

The "mapping ID" may be used by the eNB 703 to map data received from one WTRU's bearer to the other WTRU's bearer. The communication path via the eNB 703 may be enabled. At 717, WTRU1 701 and WTRU2 702 may start the communication path via the eNB 703.

Figure 8:
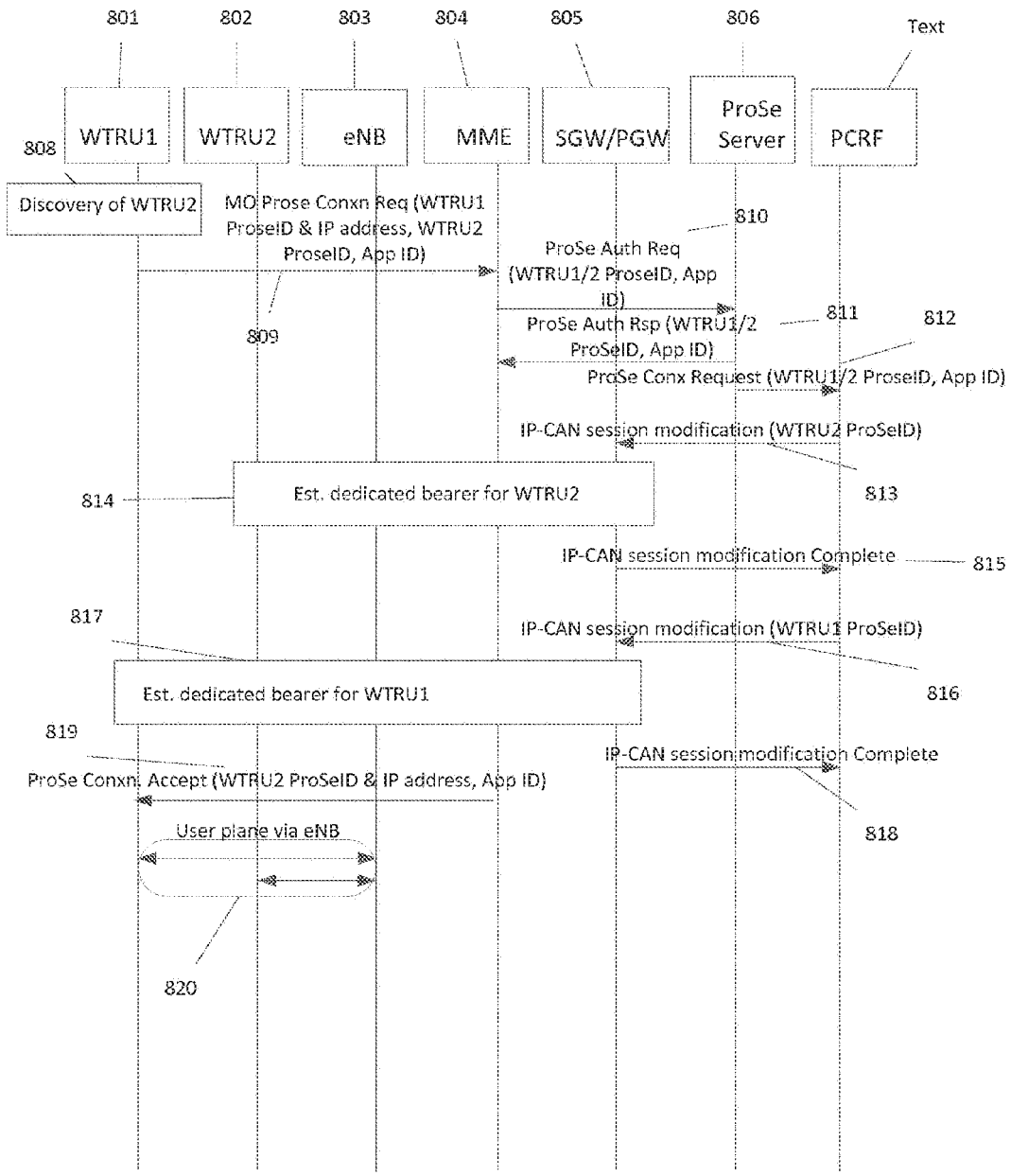
FIG. 8 illustrates an example an establishment of ProSe Communication path via eNB, including a PCRF initiated Dedicated Bearer.

FIG. 8 illustrates an example an establishment of ProSe Communication path via eNB, including a PCRF initiated Dedicated Bearer Initiation by PCRF. The MME may send the request to establish a ProSe communication path to the proximity server, for example when the MME may receive the request to setup a proximity connection by one or the proximity WTRUs. The dedicated bearer may be established using the network based dedicated bearer establishment procedure, for example, based on the response form the proximity server and as illustrated in the call flow diagram of FIG. 8. TMME and the ProSe server may interface in the establishment of the ProSe communication path.

In FIG. 8, at 808, WTRU1 801 and WTRU2 802 may be in ECM-connected mode and may have discovered each other. WTRU1 801 may have discovered WTRU2 802. At 809, WTRU1 801 may send an NAS request (e.g., MO Prose Connection Request) to the MME 804. The NAS request message may include ProseID and IP address and/or other parameters of WTRU1 801 to be used for this session, the ProseID of WTRU2 802, and/or the application identify, etc. The NAS request may indicate that WTRU1 801 may wish to establish a ProSe session with WTRU2 802. At 810, the MME 804 may request the ProSe Server 806 to perform authorization for this session (e.g., for the ProseID of WTRU1 801 and WTRU2 802 and/or the application identity, etc.). At 811, the ProSe Server 806 may inform the MME 804 that the ProSe session is authorized for the WTRU1 801 and WTRU2 802 for the given application. The ProSe session 806 may send a message to the PCRF 807, for example via already defined interface, Rx or a new interface between ProSe server 806 and the PCRF 807, etc. At 812, the PCRF 807 may receive the ProSe connection request from the ProSe server 80. The PCRF 807 may apply policies for the proximity connection. The PCRF 807 may trigger the establishment of dedicated bearers for WTRU1 801 and WTRU2 802. At 813, the PCRF 807 may initiate an IP CAN session Modification procedure, for example, so that the PDN GW may request IP CAN Bearer Signaling and/or start the procedure for establishing a dedicated bearer for WTRU2 802. The PCRF 807 may include the ProSe ID of WTRU2 802 in the IP CAN session modification and/or a similar message to PGW 805. The inclusion of ProSe ID/ProSe indication may inform the CN nodes that this dedicated bearer is for proximity connection. At 814, a Dedicated Bearer may be established as described in 712, 713 and 714 of FIG. 7. In 712, 713 and 714 as applied to 814, the eNB 803 may get the mapping ID for the eNB path as previously described. At 815, an IP session modification complete may be sent to the PCRF 807, for example after the establishment of dedicated bearer for WTRU2 802. At 816, the PCRF 807 may initiate IP CAN Session Modification procedure, for example, so that the PDN GW may request IP CAN Bearer Signaling and/or start the procedure for establishing dedicated bearer for WTRU1 801. The PCRF 807 may include the ProSe ID of WTRU1 801 in the IP CAN session modification and/or a similar message to PGW 805. The inclusion of ProSe ID and/or ProSe indication may inform the CN nodes that this dedicated bearer is for proximity connection. At 817, a Dedicated Bearer may be established as described in 712, 713 and 714 of FIG. 7. During 712, 713, and 714 as applied to 817, the eNB 803 may get the mapping ID for the eNB path. At 818, an IP session modification complete may be sent to the PCRF 807, for example, after the establishment of dedicated bearer for WTRU1 801. At 819, the MME 804 may respond to WTRU1 801 with a NAS message (e.g., ProSe Connection Accept) that may include ProseID, IP address, and/or other parameters of the WTRU2 802, and/or the application identity, etc. At 820, WTRU1 801 and WTRU2 802 may start the communication path via the eNB 803.

Figure 9:
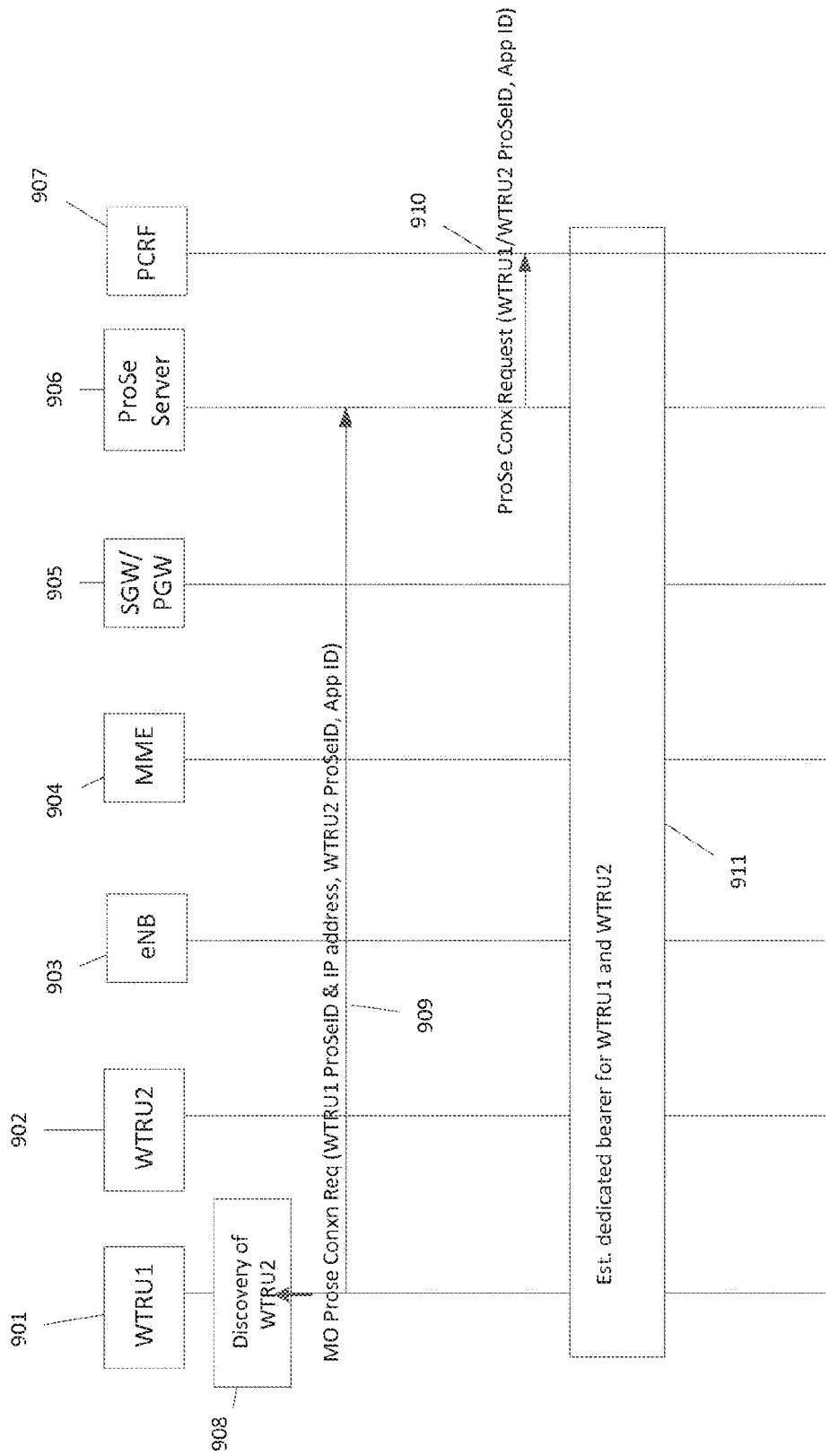
FIG. 9 illustrates another example of an establishment of ProSe Communication path via eNB, including PCRF initiated Dedicated Bearer.

FIG. 9 illustrates another example of an establishment of ProSe Communication path via eNB, including a PCRF initiated Dedicated Bearer. The ProSe server 906 may be Application Server/Function in the Internet, for example where an interface between the MME 904 and the ProSe server 906 may be missing. The ProSe server 906 may either by 3GPP controlled and/or outside the control of the network. In FIG. 9, at 908, WTRU1 901 and WTRU2 902 may be in ECM-connected mode and may have discovered each other. WTRU1 901 may have discovered WTRU2 902. In 909, the WTRU1 901 may directly (e.g., through application level signaling) send a MO ProSe Connection Request to the ProSe Server 906. This message may include the ProseID and/or IP address, and/or other parameters of WTRU1 901 to be used for this session, the ProseID of WTRU2 902, and/or the application identity, etc. At 910, the PCRF 907 may receive the ProSe connection request from the ProSe server 906. The PCRF 907 may apply policies for the proximity connection. The PCRF 907 may trigger the establishment of dedicated bearers for WTRU1 901 and WTRU2 902. At 911, a dedicated bearer for WTRU1 901 and WTRU2 902 may be established, for example by applying 813, 814, 815, 816, 817, 818, 819 and 820 as described in reference to FIG. 8.

The ProSe server may contact the PCRF via Rx interface and/or a new interface between ProSe Server and PCRF, for example, when the ProSe server receives the request to establish a ProSe session. The establishment of dedicated bearers for WTRU1 and WTRU2, for example for the purpose of proximity service, as shown in FIG. 9, may be initiated when the ProSe server contacts the PCRF.

The ProSe server may use the IP address of the WTRUs to find the PCRF, for example, as illustrated in FIG. 8 and FIG. 9. The ProSe server may find the PCRF by the ProSe server knowing the IP address of the WTRU or by the ProSe registration procedure. The ProSe server may receive the WTRU1/WTRU2 IP address in 810 of FIG. 8. The AF (e.g., Prose Server) may identify WTRU1/WTRU2 based on their ProSe IDs. The ProSe ID may be signaled in IP-CAN session establishment. The AF (e.g., Prose Server) may use a diameter routing agent to learn the ProSe ID.

The MME initiated dedicated bearer triggering procedure described herein and/or the PCRF initiated dedicated bearer signaling procedure described herein may apply to direct WTRU to WTRU bearer setup. The MME may be unable to send the mapping ID to the eNB. The MME may send an indication and/or some form of indication to inform the eNB to establish a direct WTRU to WTRU bearer.

Security procedures and signaling for direct WTRU-to-WTRU NAS communication may be utilized to facilitate ProSe communication and reduce traffic and congestion. The NAS protocol may operate for communication between the WTRU and the MME in a secure manner. In an example, for proximity based services, WTRUs may be configured to send NAS messages directly other WTRUs in order to establish and/or maintain a ProSe session. The WTRUs may be configured to implement the direct WTRU-to-WTRU NAS communication in a secure manner. Security may be established and supported for the user plane. The user plane security configuration may be finalized and/or activated after the SMC has been transmitted and/or received. The user-plane security context may operate between the WTRU and the eNB. Security communication between the WTRUs involved in a ProSe session for both the NAS and the AS layers may be utilized to reduce traffic and congestion in order to facilitate ProSe communication.

The WTRUs may be configured to determine the identity of supported keys and/or algorithms for NAS and/or AS layer security. The WTRU may determine an appropriate security context or a portion of a security context for ProSe communications based in its configuration for NAS and/or AS layer security. A portion of a security context may be one or more security related parameters. For example, when registering in the network using an Attached Request message, a WTRU may be configured to send an indication including the type of security algorithms that the WTRU supports. For example, the WTRU may send an indication regarding supported security algorithms or parameters may be included in the WTRU Network Capability information element (IE) that may be part of the Attach Request message. The network (e.g., MME) may select at least one security algorithm based on those indicated by the WTRU in the Attach Request. The network (e.g., MME) may ensure that the selected security technique is supported by the WTRU. The WTRU may be configured to select a different security algorithm for ProSe Communications than the security algorithm selected by the network for NAS security. In an example, the network (e.g., MME) may indicate the security algorithm to be used by the WTRU for direct ProSe communication. The network may provide ProSe security information may be provided to the WTRU. The WTRU may receive the ProSe security information from the network. The WTRUs may exchange ProSe security information. The WTRUs may belong to different PLMNs.

A WTRU may be configured to activate security at the NAS layer for direct WTRU-to-WTRU ProSe communications. For example, the MME may be configured to initiate the SMC procedure, for example after selecting an appropriate security algorithm when communicating via the 3GPP network. The MME may be configured to indicate to the WTRU the identity of the selected algorithm. The WTRU may be configured to receive an indication including the identity of a selected algorithm from the MME. For WTRU-to-WTRU communication, the WTRU may be configured to initiate the SMC procedure to indicate the chosen algorithm, for example for secure NAS communication between WTRUs. A WTRU may be configured to initiate and/or select security at the RRC layer for control plane and/or user plane may for direct WTRU-to-WTRU communications.

The NAS and/or AS layer security may be affected if there are at least two ProSe sessions for a WTRU. For example, different NAS and/or AS layer security may be established for different ProSe sessions, for example if the ProSe sessions are between different WTRUs.

For example, security keys for ProSe may be associated per WTRU, per ProSe session, and/or per application. These rules may affect the secure communication and different ProSe contexts may result in different security architectures being utilized.

Direct WTRU to WTRU security procedures may be utilized to facilitate ProSe communication and reduce congestion to allow signaling related to ProSe communications to continue without interruption. The term "security context" may refer to at least one security key and/or at least one security key in conjunction with at least one security algorithm. The security context may be applicable to NAS security and/or AS security (e.g., control or user plane, or both).

Figure 4:
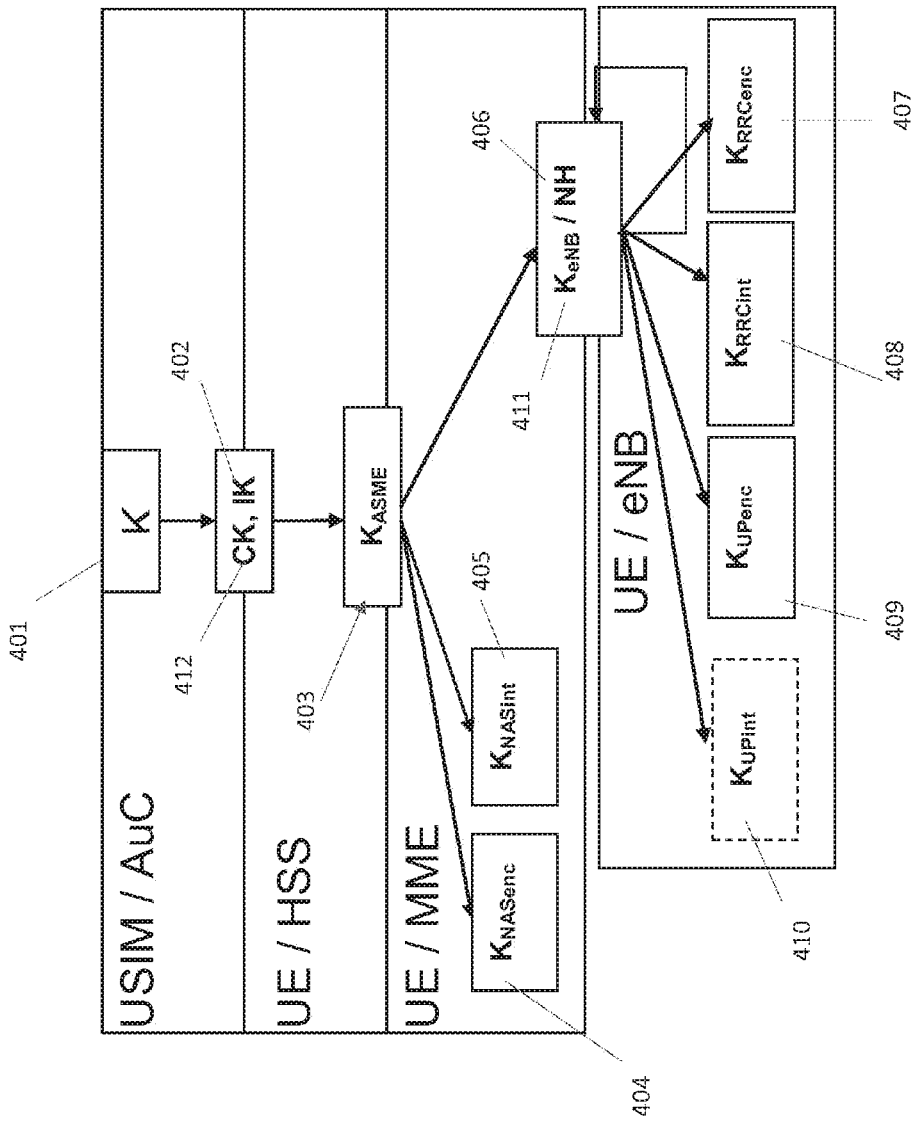
FIG. 4 is a diagram illustrating an example of a security key hierarchy consistent with embodiments.

FIG. 4 illustrates an example of hierarchy in security keys in WTRU and the network. Non Access Stratus (NAS) and/or Access Stratus (AS) security may be supported in LTE. The WTRU and the mobility management entity (MME) may use a key referred to as $K_{ASME}$ 403. $K_{ASME}$ 403 may be the key derived for communications associated with an access security management entity (ASME). $K_{ASME}$ 403 may be an intermediate key derived in the home subscriber server (HSS) and WTRU from, for example, cipher keys (CK) 412 and/or integrity keys (IK) 402 during Authentication and Key Agreement (AKA). $K_{ASME}$ 403 may be sent as part of the Evolved Packet System (EPS) authentication vectors (AV) from HSS. $K_{ASME}$ 403 may be identified with evolved key set identifiers (eKSI) allocated by the MME during the AKA process. The MME may assume the role of the ASME in EPS. The NAS and AS keys may be generated from $K_{ASME}$ 403. NAS may be generated by the WTRU and/or MME. NAS keys may be generated by the WTRU and MME, for example by executing a NAS Authentication procedure.

K 401 may be a key stored in the universal subscriber identity module (USIM) of the WTRU. $K_{eNB}$ 406 may be an eNB base key. $K_{eNB}$ 411 may be an intermediate key derived in MME and WTRU from $K_{ASME}$ 403, for example, when the WTRU transitions to the ECM-CONNECTED state or by WTRU and target eNB from $K_{eNB}*$ during handover. $K_{eNB}*$ may be an eNB handover transition key. $K_{eNB}*$ may be an intermediate key derived in source eNB and WTRU during handover, for example, when performing horizontal ($K_{eNB}$) or vertical key derivation. $K_{eNB}*$ may be used at target eNB to derive $K_{eNB}$. NH 406 may be an intermediate key derived in MME and WTRU used to provide forward security and/or forwarded to eNB via SI-MME interface. $K_{NASint}$ 405 may be an integrity key for protection of NAS data derived in MME and WTRU. $K_{NASenc}$ 404 may be an encryption key for NAS signaling for protection of NAS data derived in MME and WTRU. $K_{UPenc}$ 409 may be an encryption key for user plane for protection of user plane data derived in eNB and WTRU. $K_{UPint}$ 410 may be an integrity key for user plane for protection of user plane data derived in eNB and WTRU. $K_{RRCint}$ 408 may be an integrity key for protection of RRC data derived in eNB and WTRU. $K_{RRCenc}$ 407 may be an encryption key for protection of RRC data derived in eNB and WTRU.

A WTRU may be configured to implement a Security Mode Command (SMC) procedure, for example after key generation. The WTRU may utilize the SMC procedure to facilitate agreement on an algorithm to use for secure communication. The WTRU may be configured to use the algorithm as an input to compute the NAS keys $K_{NASenc}$ and $K_{NASint}$. The WTRU may run a procedure (e.g., SMC procedure, etc.) at the RRC layer. The WTRU may compute the RRC integrity and/or encryption keys for the user and/or control planes. Encryption may not be mandatory. Integrity may be mandatory. The WTRU may be configured to perform the SMC procedure at the NAS layer. The SMC procedure performed by the WTRU at the NAS lay may be independent of the SMC procedure performed by the WTRU at the RRC layer. The WTRU and the network may start a secured communication after the WTRU sends the Security Mode Complete message to the MME, after the SMC procedure, etc. The WTRU may send control (RRC) messages and/or user plane information securely, for example after the SMC procedure completion at the RRC level.

A WTRU may utilize a Security Context for ProSe communication to enable secure ProSe communication for NAS layer, AS layers, and for user and/or control planes, etc.

The WTRU may be configured use the same security context and/or algorithms used for communication with the network may be re-used for ProSe communication. For example, the network may ensure that the WTRU's NAS and/or AS security context in use for non-ProSe communication may also be used for ProSe communication. In an example, a WTRU may reuse NAS security context (e.g., perhaps only NAS security context) for ProSe communication between WTRUs. The WTRUs may re-use the 3GPP NAS security context for NAS security. The 3GPP NAS security context for NAS security may be security between the WTRU and MME. The WTRU may use different AS security context for Prose sessions from the AS security context used for non-Prose communication. The AS security context for non-Prose communication may be security between WTRU and eNB. The WTRU may reuse the AS security context (e.g., only AS security content) for ProSe communication between WTRUs. The WTRUs may re-use the 3GPP AS security context for AS security. The 3GPP AS security context for AS security may be security between WTRU and eNB). The WTRU may use a different NAS security context for ProSE sessions from MAS security context used for non-ProSe communication. The NAS security context for non-ProSe communication may be security between the WTRU and the MME.

A WTRU may be configured to have a separate security context that may be defined for proximity services. The HSS may update the the WTRU security context for proximity services. The WTRU may update the WTRU security context for proximity services (e.g., USIM). The WTRU may use a different security context used for 3GPP communication from the security context that the WTRU may use for ProSe communication. The 3GPP communication for NAS protocol may be between WTRU and MME. The 3GPP communication for user planes and/or control planes, etc. may be between WTRU and eNB.

A WTRU may be configured to utilize security parameters and/or context that may be defined for use per WTRU. For example, a WTRU that may support communication may have one set of prose security context (e.g., perhaps only one set). The security parameters and/or context may be per PLMN. For example, the WTRU may use a different security context when registered under different PLMNs. A PLMN to which a WTRU may register may provide a WTRU with the security context to be used in the same or similar PLMNs. A WTRU may be configured to receive the security context to be used in the same or similar PLMNs from the PLMN. The security context used by a WTRU may be dependent on the PLMN of the WTRUs that may register with the PLMN.

A WTRU may be configured to utilize security parameters and/or context that may be defined for use per application. For example, a WTRU may use a different, known and/or configurable security context, for example when engaging in a ProSe communication for an application. The WTRUs may be unable to exchange security parameters for the user plane per application. A WTRU may be aware of the security context to be used per application via configuration. A WTRU may be aware of the security context to be used per application via previous security parameters exchanged with another WTRU and/or the network, etc. For example, a WTRU may be configured to receive commands and/or configurations from the MME, ProSe Server, ANDSF, or another node that include the security context to use per application. In an example, the WTRU may receive configuration from the MME to use a security context per application in an NAS message, for example Attach Accept, Tracking Area Update (TAU) Accept, etc. The NAS message may have multiple security context indications per application, for example, the MME may send an indication including a list of applications and the corresponding security context to be used to the WTRU. The WTRU may be configured to receive the indication including the list of applications and the corresponding security context to be used from the MME. The WTRU may be configured to accept or reject the information contained in the indication sent by the MME.

A WTRU may be configured to act as a public safety WTRU and may use a different security context only for public safety WTRUs and/or applications.

The source MME may be configured to choose a security context. The source MME may forward security context chosen to the target MME and/or to the target WTRU, for example for inter-PLMN/MME. The source MME may pick a security context, for example after agreeing on the set of keys with the WTRU. This source MME or target MME may pass the security context to the target WTRU.

A first WTRU may be configured to authenticate a second WTRU. The first and second WTRUs may be configured to performed implicit authentication, for example, by decoding expression codes.

A security context for ProSe may be chosen to enable secure ProSe communication. ProSe communication may be direct WTRU-to-WTRU communication. ProSe communication may be WTRU to the eNB to WTRU communication. A WTRU may have multiple ProSe sessions with multiple WTRUs. In an example, a WTRU that may belong to a WTRU pair in a ProSe session may be configured to negotiate the security context (e.g., keys and/or algorithms) with the other WTRU or eNB involved in the ProSe session, for example, so that control plane and/or user plane ProSe communications may be secure.

A WTRU may be configured to send an indication to the network including the WTRU's security capabilities. The indication may be sent in an NAS message, for example, upon registration to the network (e.g., Attach Request or TAU Request). The indication may include security capabilities of the WTRU and the capability of the WTRU to support a secure ProSe communication. The security capabilities may include the supported security context (e.g., keys and/or algorithms) for ProSe communication of the WTRU, for example per PLMN, per application, etc. The security capabilities may include information, for example, that may be in the form of a new IE that the WTRU may include in the NAS message (e.g. a ProSe Security Capability IE may be defined). The indications may be part of an existing IE, for example the WTRU Network Capability IE. The security capabilities may include capability and/or general indications for the WTRU and/or eNB. For example, the WTRU may indicate its preference to use different and/or the same security context for use in the ProSe session. The WTRU may be configured to send an indication including a preference to use the same security context for ProSe as for non-ProSe communication. The WTRU may be configured to send an indication including a preference for security context per application, etc. The security capabilities may be used independently or in any combination.

A WTRU may be configured to indicate its preference for security context, for example, per application, per PLMN, and/or for NAS and/or AS security, for example upon registration to the network and/or during any NAS procedures and/or any NAS message.

The MME may be configured to indicate to the WTRU the security context to use for ProSe communications, for example for NAS and/or AS security, and for user plane and/or control plane. The MME may indicate to the WTRU the security context to be used for ProSe communication by using any NAS message. For example, the MME may indicate the security context to be used in ProSe communication in registration responses (e.g., Attach Accept and/or TAU Accept), and/or any other NAS messages. The MME may have local configurations and/or operator policies. The MME may used local configurations and/or operator policies to determine the security context to use for ProSe communication. The HSS may contain information relevant to the security context to be used for ProSe communication. The MME may download information relevant to the security context to be used for the ProSe communication, for example, when a WTRU registers to the system. The HSS may push information relevant to the security context to be used for the ProSe communication to an MME, for example, when the subscription information may change for a registered WTRU.

A WTRU may be configured to determine a security context for ProSe in a static manner. A WTRU may be configured to determine a security context for ProSe in a dynamic manner. In an example, during the setup of a ProSe session, a WTRU may be configured to agree on the use of a security context as the ProSe session is being set up, for example if one or more WTRUs are involved or implicated in setting up a ProSe session.

An initiating WTRU may be configured to include a set of security context the WTRU may use for a given ProSe session. The WTRU may send an NAS message to the MME for establishing a ProSe session. The NAS message may include the security context for establishing the ProSe session. The security context may be based on configurations in the WTRU. The security context may be based on indications that may be received from the network. For example, the WTRU may be configured to use a set of security context for Prose communications. The WTRU may be configured locally or by the MME or via ANDSF, etc. with respect to the security context for ProSe communications.

The MME may be configured to select a sub-set security context from the proposed security context. The MME may be configured to select a sub-set security context from the proposed security context, for example upon reception from a source WTRU of a request to setup a ProSe session with a set of security contexts. The MME may be configured to select a sub-set security context from the proposed security context, for example, based on local MME configuration, as per subscriber profile, depending on the target WTRU, depending on the application, and/or depending on the PLMN that may be served by the target WTRU, etc. The MME may verify with another entity (e.g. a ProSe server) in order to select the security context. The MME may verify the requested application with another entity (e.g. a ProSe server). The MME may forward a set of security contexts to the ProSe server. The MME may select the security context to use. The MME may select the security context to use based on application type and/or target WTRU PLMN, etc. The MME may request the network entity (e.g. ProSe server) to select a security context based on an indicated application type, identities of WTRUs, and/or serving PLMNs, etc. The ProSe server may select a security context based on configurations as per operator policies. The ProSe server may indicate to the MME the selected security context. The MME may receive the indication from the ProSe server including the instruction with the selected security context. The source MME may contact the target MME that is serving the target WTRU. The source MME may include a set of security context that may have been selected for the source WTRU. A target MME may choose a security context for the session as per local configurations, as per verification with a ProSe server and/or another network entity. A target MME may choose a security context for the session upon reception of a request for ProSe session with at least one set of security context. The target MME may select from a subset of security context that may be supported by the source MME and/or source WTRU. The target MME may indicate to the target WTRU a set of security context to use for the ProSe session. The target MME may send an NAS message to the target WTRU. The NAS message may include the security context that may be used by the target WTRU. The NAS message may indicate the termination or pending termination of the ProSe session. The MME may include the set of possible security context from which the target WTRU may select in the NAS message sent to the target WTRU. The target WTRU may be configured to choose the security context that may ensure that a choice is made from the supported security context in the source MME and/or source WTRU. One or more or each node may be configured to indicate whether a security context is supported. A WTRU or MME may indicate that the source node may support the indicated security context by including the security context in the NAS message and/or indication sent to the target WTRU or target MME.

A WTRU may be configured to select a security context based on local configurations in the WTRU. A WTRU may be configured to select a security context based on local configurations in the WTRU, for example upon reception (e.g., from an MME or another WTRU directly) of an incoming ProSe session request with at least one security context. A WTRU may select a security context based on the common supported security context between the source and target WTRUs. A WTRU may select a security context based on the common supported security context between the source and target WTRUs, for example upon reception (e.g., from an MME or another WTRU directly) of an incoming ProSe session request with at least one security context. A WTRU may select a security context based on, for example, application type, PLMN ID, public safety WTRU, public safety application, etc. The WTRU may respond to the MME, another WTRU, and/or the node that sent the terminating request with the chosen security context. The MME may indicate the chosen security context to a source WTRU and/or MME, for example upon reception by an MME (e.g. from a WTRU) of a response with a choice of at least one security context. The source MME may inform the source WTRU about the chosen security context. The source MME may inform the source WTRU using new and/or existing NAS messages.

One or more or each node (e.g., source WTRU, source MME, target WTRU, target MME, source ProSe server, and/or target ProSe server) may indicate to another entity whether the security context desired may include encryption protection, integrity protection, or both.

A node may be configured to activate security for ProSe communication. A node may activate security, for example upon taking into account the security context that has been chosen. For example, when a WTRU registers to the system, a WTRU may be configured to run an authentication procedure. A WTRU may run an authentication procedure in order for the network and the WTRU to authenticate each other. A WTRU may run an authentication procedure in order for the network and the WTRU to agree on a set of keys for security. A WTRU may run an SMC procedure. A WTRU may run an SMC procedure in order to choose an algorithm. A node may consider security to be activated, for example, after the WTRU runs an SMC procedure. An NAS messages may be security protected. A WTRU may run an SMC procedure to securely protect RRC messages and/or user plane data, for example, at the AS layer. WTRUs may directly exchange the NAS messages and/or user plane data, for example in ProSe communication. A WTRU may be unaware when and/or how the security may be activated. A WTRU may be unaware of which node may be responsible to activate security.

A node may be configured to consider the security context as activated, for example, upon the choice of a security context. A node may be configured to consider the security context as activated, for example when a choice of security context is made (e.g., static and/or dynamic).

A node may be configured to consider the security context as activated, for example, after an SMC procedure may be run by the WTRU. The WTRU may run the SMC procedure at the NAS and/or AS layers. An SMC procedure may activate or help activate the security context. The initiating WTRU may run the SMC procedure towards the terminating WTRU. The initiating WTRU may run the SMC procedure towards the terminating WTRU after (e.g., explicitly after) the network may have allowed the ProSe session to take place and/or after a security context may have been chosen. The SMC procedure may be part of the initial request that the WTRU may send to the network for requesting a ProSe session. For example, the NAS message that a source WTRU may send to its MME may include an SMC sub-message and/or an SMC IE. The SMC sub-message and/or an SMC IE may be forwarded to the target WTRU, for example via a target MME similar to choosing a security context. The target WTRU may send a response to the source WTRU that may indicate a response to the SMC (e.g., say a Security Mode Response) that may finalize the choice and/or activation of security context and protection. The terminating WTRU may run the SMC procedure directly. The terminating WTRU may run the SMC procedure, for example before the terminating WTRU responds to its MME. The terminating WTRU may run the SMC procedure before the terminating WTRU responds to its MME if the terminating WTRU has received an MT request for an incoming ProSe session from a source WTRU. A target WTRU may run an SMC procedure with the source WTRU to choose and/or activate the security context, for example, upon reception of a terminating request for a ProSe session. The target WTRU may respond to the MT request. The target WTRU may accepts the MT request, for example, after the target WTRU run an SMC procedure with the source WTRU. The target WTRU may reject the MT request, such if the SMC procedure fails or times out.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for securing a Proximity Services (ProSe) communication session, the method comprising:
   a first wireless transmit/receive unit (WTRU) selecting a security context for the ProSe communication session;
   the first WTRU initiating a security mode command (SMC) procedure with a second WTRU, wherein the security context for the ProSe communication session is activated after the first WTRU completes the SMC procedure with the second WTRU; and
   the first WTRU communicating directly with the second WTRU using the security context for the ProSe communication session.

2. The method of claim 1, wherein the SMC procedure comprises:
   the first WTRU sending a SMC message to the second WTRU; and
   the first WTRU receiving a SMC response message from the second WTRU.

3. The method of claim 2, wherein the SMC response message confirms the selected security context for the ProSe communication session.

4. The method of claim 1, wherein the SMC procedure is used to derive one or more security keys for the security context.

5. The method of claim 1, wherein the SMC procedure is performed at a non-access stratum (NAS) layer.

6. The method of claim 1, wherein the SMC procedure uses radio resource control (RRC) signaling.

7. The method of claim 1, wherein the security context for the ProSe communication session is selected, by the first WTRU, based on one or more of a local configuration and a common supported security context between the first WTRU and the second WTRU.

8. The method of claim 1, further comprising:
   the first WTRU indicating security capabilities in one or more of an attach request message and a tracking area update request message.

9. The method of claim 1, wherein the security context comprises a user-plane security context.

10. A first wireless transmit/receive unit (WTRU) comprising:
    a processor configured to:
    select a security context for a Proximity Services (ProSe) communication session; and
    initiate a security mode command (SMC) procedure with a second WTRU, wherein the security context for the ProSe communication session is activated after the first WTRU completes the SMC procedure with the second WTRU; and
    a transceiver configured to communicate directly with the second WTRU using the security context for the ProSe communication session.

11. The first WTRU of claim 10, wherein the SMC procedure comprises the transceiver configured to:
    send a SMC message to the second WTRU; and
    receive a SMC response message from the second WTRU.

12. The first WTRU of claim 11, wherein the SMC response message confirms the selected security context for the ProSe communication session.

13. The first WTRU of claim 10, wherein the SMC procedure is used to derive one or more security keys for the security context.

14. The first WTRU of claim 10, wherein the SMC procedure is performed at a non-access stratum (NAS) layer.

15. The first WTRU of claim 10, wherein the SMC procedure uses radio resource control (RRC) signaling.

16. The first WTRU of claim 10, wherein the security context for the ProSe communication session is selected based on one or more of a local configuration and a common supported security context between the first WTRU and the second WTRU.

17. The first WTRU of claim 10, wherein the processor is configured to indicate security capabilities in one or more of an attach request message and a tracking area update request message.

18. The first WTRU of claim 10, wherein the security context comprises a user-plane security context.

* * * * *